US005825396A

United States Patent [19]

Fujishiro

[11] Patent Number: 5,825,396

[45] Date of Patent: *Oct. 20, 1998

[54] COLOR THERMAL PRINTER WITH DRIVER AND INTERLOCKING DEVICE

[75] Inventor: Takeshi Fujishiro, Saitama, Japan

[73] Assignee: Fuji Photo Film Co., Ltd., Kanagawa, Japan

[ * ] Notice: The term of this patent shall not extend beyond the expiration date of Pat. No. 5,629,729.

[21] Appl. No.: 519,094

[22] Filed: Aug. 24, 1995

[30] Foreign Application Priority Data

| | | | |
|---|---|---|---|
| Aug. 25, 1994 | [JP] | Japan | 6-200585 |
| Sep. 2, 1994 | [JP] | Japan | 6-210085 |

[51] Int. Cl.[6] .......... B41J 2/315; B41J 2/325; G01D 15/16

[52] U.S. Cl. .......... 347/212; 347/175

[58] Field of Search .......... 347/175, 211, 347/156, 232, 102; 399/320, 336; 400/120.18

[56] References Cited

U.S. PATENT DOCUMENTS

| | | | |
|---|---|---|---|
| 4,734,704 | 3/1988 | Mizutani et al. | 347/212 |
| 5,216,438 | 6/1993 | Nakao et al. | 347/175 |
| 5,486,856 | 1/1996 | Katsuma et al. | 347/175 |
| 5,537,140 | 7/1996 | Hayashi et al. | 347/175 |
| 5,565,903 | 10/1996 | Ueda | 347/175 |
| 5,629,729 | 5/1997 | Fujishiro | 347/175 |

*Primary Examiner*—N. Le
*Assistant Examiner*—L. Anderson
*Attorney, Agent, or Firm*—Sughrue, Mion, Zinn, Macpeak & Seas, PLLC

[57] ABSTRACT

A color thermal printer for printing a full-color image in frame-sequential fashion to a color thermosensitive recording sheet (12) including yellow, magenta and cyan coloring layers (26–28). A fixing station is disposed next to a thermal head (18). One of first and second fixing devices (30, 31) is alternatively set in a fixing station. While recording a yellow frame on the recording sheet transported in a forward direction to the fixing station, the first fixing device (30) is set in the fixing station to project ultraviolet rays for fixing the yellow coloring layer (28) onto the recording sheet. While the recording sheet temporarily stops with its end nipped between a pair of transport rollers, a shutter plate (70) is inserted between the recording sheet and the first fixing device still projecting the ultraviolet rays, at the same speed as the transport speed of the recording sheet to uniformly and sufficiently fix as much area of the recording sheet as possible. After the yellow fixation, the recording sheet is moved in a reverse direction toward the thermal head. While recording a magenta frame, the second fixing device (31) generates ultraviolet rays for fixing the magenta coloring layer (27).

25 Claims, 19 Drawing Sheets

COLOR THERMAL PRINTER WITH DRIVER AND INTERLOCKING DEVICE

BACKGROUND OF THE INVENTION

1. Field of the Invention

The present invention relates to a color thermal printer. More particularly, the present invention relates to a color thermal printer in which a color thermosensitive recording sheet is optically fixed and bleached as uniformly as possible, while using as much area of the sheet for printing as possible.

2. Description Related to the Prior Art

There is a known color thermal printer in which color thermosensitive recording material is used and a full-color image is printed thereon. The recording material includes a support, and cyan, magenta and yellow coloring layers formed on the support in the order listed.

When printing, a thermal head is pressed against the recording material. A yellow image, at first, is thermally recorded to the yellow coloring layer line-by-line, shortly before the yellow coloring layer is fixed optically, i.e., photochemically. Then a magenta image is recorded to the magenta coloring layer, which is fixed immediately. Finally a cyan image is recorded to the cyan coloring layer, to obtain the full-color image.

The thermal recording and the optical fixation to recording layers are effected while the recording material is transported relative to the thermal head and an optical fixing device. To move the recording material past the thermal head, there are plural types of printers: a platen drum type and a back-and-forth moving type.

In the platen drum type, a sheet of the recording material is mounted on the periphery of a platen drum. A clamp member is disposed on the platen drum, and is adapted to clamp an end of the recording sheet, to position it on the platen drum. An advantage of the platen drum type is in that only small area along one end of the recording sheet is needed for positioning at the clamp member. An image can be recorded on the recording sheet only with small margin portions. However, as the platen drum must have a sufficiently large diameter enough to support a recording sheet around it, there is a limit in reducing the size of the platen drum type printer when it is required to record sheets of a B5 or A4 size. In addition, as the size of the platen drum becomes larger, a drive motor for the platen drum must have larger power. The platen drum type is suitable for a recording sheet of a smaller size such as a postcard size.

FIG. 20 schematically illustrates a color thermal printer of a type of back-and-forth movement. A pair 2 of transport rollers, consisting of a nip roller 2*a* and a lower drive roller 2*b*, first nip a front edge of a color thermosensitive recording sheet 3, and transport the recording sheet 3 in forward and reverse directions alternately: the forward direction from a supply tray 4 toward an exit path 5, and the reverse direction from the exit path 5 to the supply tray 4.

The recording sheet 3 is squeezed between a platen roller 7 and a thermal head 8, while yellow, magenta and cyan colors are recorded to it. The platen roller 7 has a smaller diameter compared with a platen drum for supporting the recording sheet 3 therearound.

Downstream from the transport roller pair 2 as viewed in the forward direction, there is disposed an optical fixing device 9, which includes a yellow fixing lamp 9*a* generating ultraviolet rays for yellow fixation, a magenta fixing lamp 9*b* generating ultraviolet rays for magenta fixation, and a lamp housing 9*c* for covering the fixing lamps 9*a* and 9*b*. While the recording sheet 3 is transported in the forward direction, the color images are recorded to the coloring layers. Then the fixing device 9 is actuated while the recording sheet 3 is transported in the either of the forward and the reverse directions, to fix the coloring layers photochemically.

In the back-and-forth moving type thermal printer, it is unnecessary to use the above-described platen drum. The use of the platen roller 7 is advantageous in reducing the size of the printer, as the diameter of the platen roller 7 is irrespective of the size of the recording sheet 3.

In the back-and-forth moving type thermal printer, simple mechanisms for transporting the recording sheet 3 require the recording sheet 3 to be squeezed between the transport roller pair 2 incessantly. L1 in FIG. 20 designates a minimum length of an edge portion of the recording sheet 3 necessary for keeping it nipped in the transport roller pair 2. As shown, because a rear end portion L1+L2 of the recording sheet 12 extending from its rear edge 3*a* to a position stopping at a rear end of the lamp housing 9*c* in the forward direction cannot be positioned in a fixing station A1 under the fixing device 9, this range L1+L2 is obliged to be an imageless margin.

Since the back-and-forth moving type requires the fixing lamps 9*a* and 9*b* arranged side-by-side along the transport path as illustrated in FIG. 20, the magenta fixing lamp 9*b* is located farther from the transport roller pair 2. As a result, even though a portion L4 preceding to the rear end portion L1+L2 in the forward direction is located in the fixing range A1 when the recording sheet 3 stops in the position shown in FIG. 20, a trailing half of the portion L4 remains unfixed with the magenta fixing lamp 9*b*. Moreover, since a leading fraction of the portion L4 has been exposed to the fixing lamp 9*a* or 9*b* for a longer time compared with a trailing fraction thereof, the degree of fixation decreases from the leading end to the trailing end of the portion L4. As a result, an uneven and insufficient fixing condition is provided in the portion L4.

Because such an insufficient fixing condition lowers the quality of the recorded image, it is necessary for a satisfactory quality to avoid recording in the portion L4 as well as in the portion L2+L1. Accordingly, the back-and-forth moving type printer needs to keep a quite large portion L3 (=L1+L2+L4) of the recording sheet 3 out of use for printing. That means the smaller area is available for printing on the recording sheet 3. Especially in such a back-and-forth type printer wherein more than one lamp is used for fixing one color to increase the amount of fixing rays and thus allow to transport the recording sheet at a higher speed, the fixing station A1 is correspondingly elongated to still more reduce the available area of the recording sheet 3.

SUMMARY OF THE INVENTION

In view of the foregoing problems, an object of the present invention is to provide a color thermal printer in which an image can be printed on a recording sheet with reduced margin portions.

In order to achieve the above and other objects and advantages, the present invention decelerates the recording sheet before stopping it while applying electromagnetic rays to the recording sheet, thereby to increase the light amount applied to a rear end portion of the recording sheet so as to compensate for lack of fixation in this end portion which would otherwise occur.

The present invention provides a shutter plate which is insertable into a fixing station to shield electromagnetic rays from the recording sheet. According to a preferred embodiment, the shutter plate is inserted when the recording sheet stops after being transported in a first direction from a thermal head to the fixing station, at the same speed as the transport speed of the recording sheet in the first direction, but in a reverse direction to the first transport direction. As a result, the rear end portion of the recording sheet in the first transport direction is exposed to the electromagnetic rays to the same degree as the preceding portion that has passed through the fixing station.

In this way, a largest possible area of the recording sheet can be fixed as equally as possible. Therefore, an image can be printed on a recording sheet with reduced margin portions around the image.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENTS OF THE PRESENT INVENTION

Figure 1:
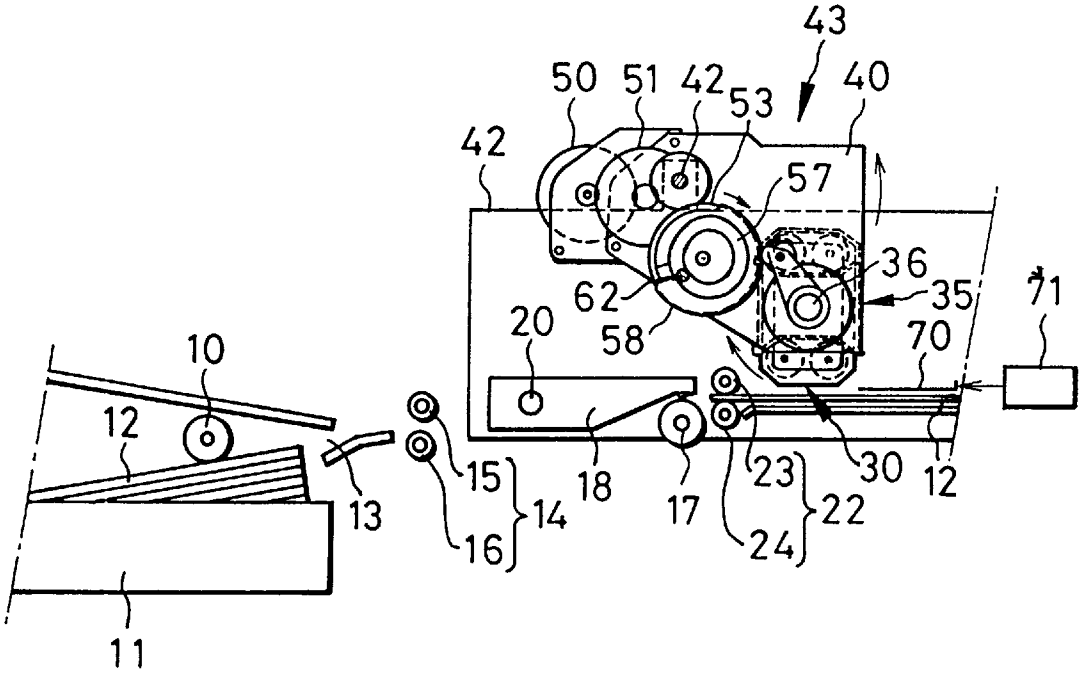
FIG. 1 is an explanatory view in elevation, illustrating a color thermal printer according to an embodiment of the present invention.

FIG. 1 illustrates important sections of a color thermal printer. A feeding roller 10 feeds a color thermosensitive recording sheet 12 from a supply tray 11. The recording sheet 12 is transported through a feeding path 13 toward a first pair of transport rollers 14. The transport roller pair 14 includes an upper nip roller 15 and a lower driving roller 16, through which the recording sheet 12 is moved into a gap between a platen roller 17 and a thermal head 18.

The thermal head 18 includes, as is known in the art, a great number of heating elements 18*a* (see FIG. 3), which are arranged in a line, and generate heat energy in accordance with a color and density at a pixel to be recorded. The thermal head 18 is mounted swingable about a shaft 20, and is swung clockwise to press the recording sheet 12 onto the platen roller 17.

The recording sheet 12 is passed between the thermal head 18 and the platen roller 17, and transported to a second pair of transport rollers 22, which includes an upper nip roller 23 and a lower driving roller 24. The recording sheet 12 is nipped between the second roller pair 22. Synchronously with the transport by the second roller pair 22, the heating elements 18*a* applies heat energy to the recording sheet 12 at an amount determined for recording a yellow image.

Figure 2:
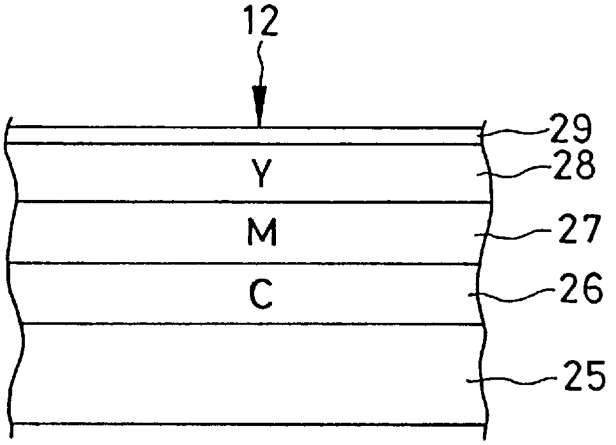
FIG. 2 is an explanatory view in section, illustrating a layered structure of a color thermosensitive recording sheet used in the thermal printer of FIG. 1.

In FIG. 2 illustrating a layered structure of the recording sheet 12, there are a cyan coloring layer 26, a magenta coloring layer 27, a yellow coloring layer 28, and a protective layer 29, which are formed on a support 25 in the order listed. The order of the recording to the coloring layers 26–28 is "yellow—magenta—cyan" from the obverse, namely from the protective layer 29 toward the support 25. If an alternative recording sheet for use with the printer has a structure as if the yellow coloring layer 28 and the magenta coloring layer 27 were interchanged, then its recording order is "magenta—yellow—cyan". The support 25 is opaque coated paper or plastic film. When the thermal printer is used for producing a sheet for an overhead projector (OHP), the support 25 can be transparent plastic film.

The cyan coloring layer 26 contains an electron donating dye precursor and an electron accepting compound as main components, and is colored in cyan when it is heated. The magenta coloring layer 27 contains a diazonium salt compound having a maximum absorbing factor at a wavelength of approximately 365 nm, and a coupler which thermally acts upon the diazonium salt compound and is colored in magenta. When receiving application of ultraviolet rays of near 365 nm after thermal recording, the diazonium salt compound of the magenta coloring layer 27 is photochemically decomposed and loses its color developability.

The yellow coloring layer 28 contains a diazonium salt compound having a maximum absorbing factor at a wavelength of approximately 420 nm, and a coupler which thermally acts upon the diazonium salt compound and is colored in yellow. When receiving application of near ultraviolet rays of 420 nm after thermal recording, the diazonium salt compound of the yellow coloring layer 28 is photochemically fixed and loses its color developability.

Figure 3:
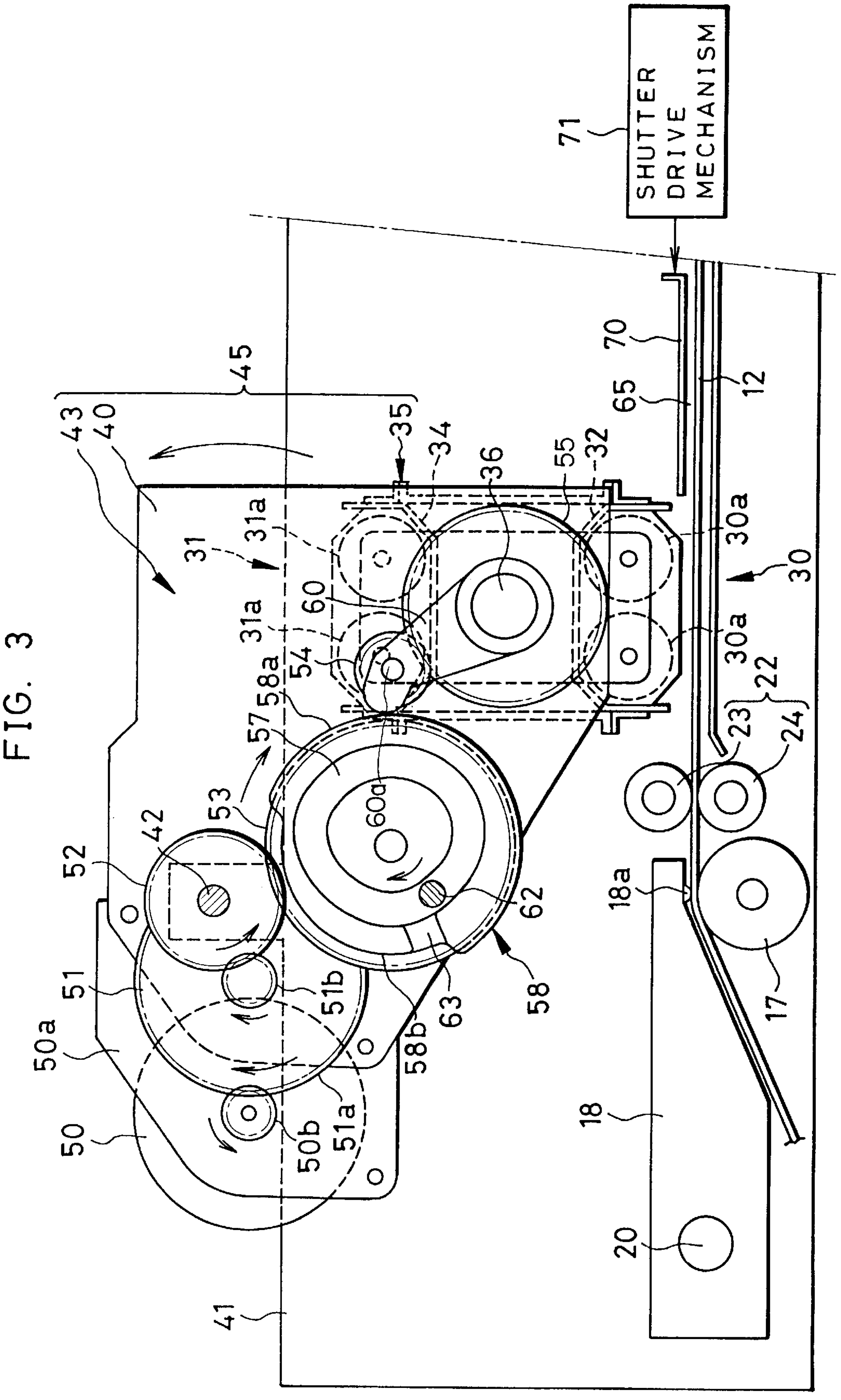
FIG. 3 is a side elevation illustrating a state where one of a pair of optical fixing devices of the thermal printer is moved down to a station for fixation.

As illustrated in FIG. 3, there are disposed first and second optical fixing device 30 and 31 closely to the nip roller 23 and downstream from the transport roller pair 22 (to the right of the transport roller pair 22 in the drawing). The yellow fixing device 30 for the yellow fixation includes two yellow fixing lamps 30*a* and a lamp housing 32. The lamp housing 32 reflects ultraviolet rays emanated from the yellow fixing lamps 30*a* and applies the rays to the recording sheet 12. The magenta fixing device 31 for the magenta fixation includes two magenta fixing lamps 31*a* and a lamp housing 34. The yellow fixing lamps 30*a* generate ultraviolet rays peaking at the wavelength of approximately 420 nm to fix the yellow coloring layer 28. The magenta fixing lamps 31*a* generate ultraviolet rays peaking at the wavelength of approximately 365 nm to fix the magenta coloring layer 27.

The fixing devices 30 and 31 are disposed on a fixer support device 35, and are rotationally symmetrical with each other about a shaft 36. Each time the fixer support device 35 makes a 180 degree rotation, the fixing devices 30 and 31 are replaced by each other to be set in a fixing station. The fixer support device 35 is mounted on a frame device 40 in rotatable fashion about the shaft 36. The frame device 40 is mounted on a printer body 41 in rotatable fashion about a shaft 42. The frame device 40 and the fixer support device 35 are linked together via a linking device 43. Thus, the frame device 40, the fixer support device 35 and the linking device 43 constitute an alternative positioning unit 45 for positioning one of the fixing devices 30 and 31 in the fixing station.

Figure 4:
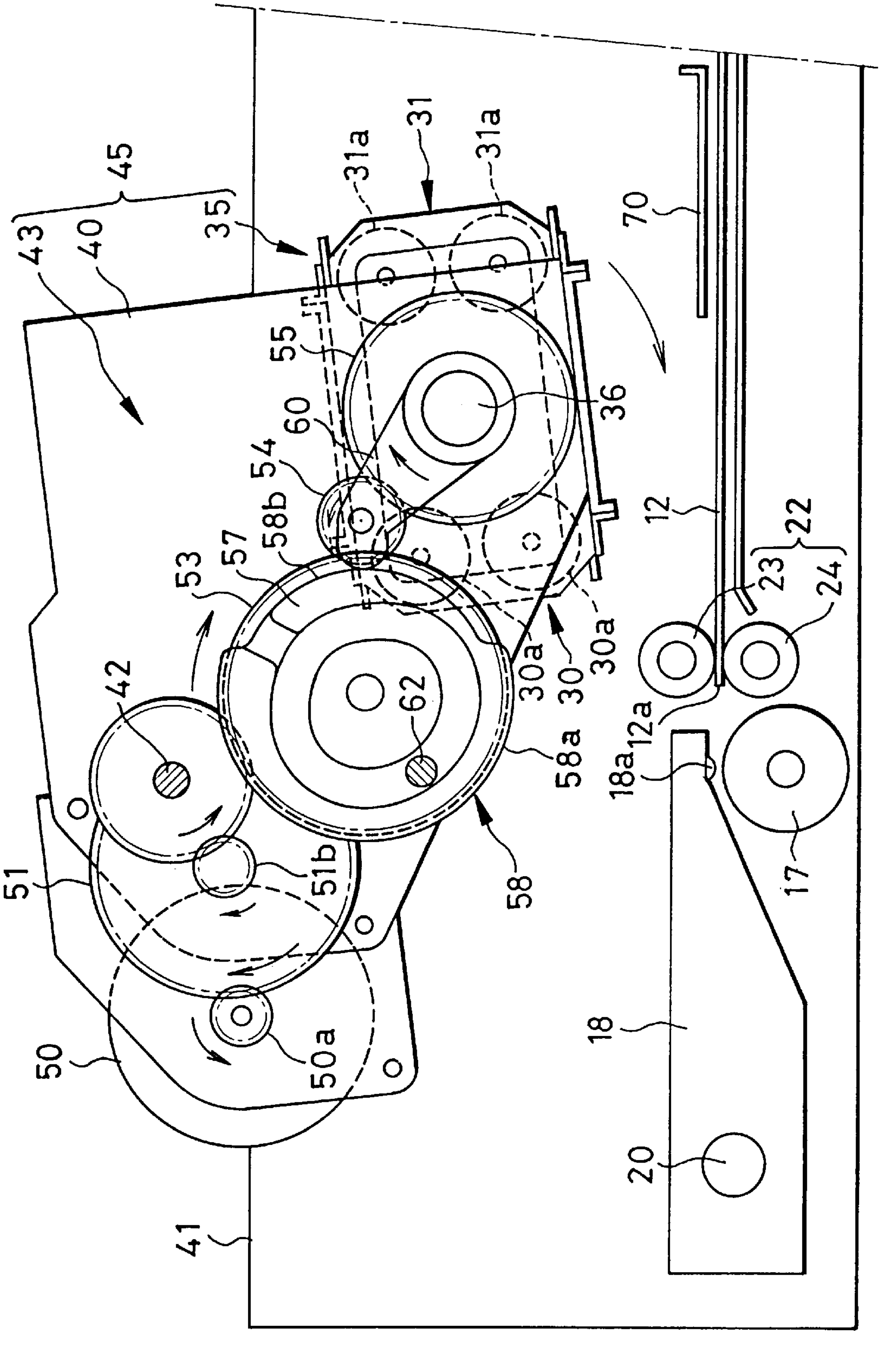
FIG. 4 is a side elevation illustrating a state where the optical fixing devices are being changed over.

The linking device 43, as illustrated in FIGS. 3 and 4, includes a motor 50, a speed reducing double gear 51, an intermediate gear 52, a first gear 53, a second gear 55, and a third gear 54. The motor 50 is mounted on a motor frame 50*a* secured to the frame device 40. The intermediate gear 52 is supported on the shaft 42 in rotatable fashion. The intermediate gear 52 is engaged with a smaller gear portion 51*b* of the double gear 51. A drive gear 50*b* of the motor 50 is in mesh with a greater gear portion 51*a* of the double gear 51, so that rotation of the motor 50 is reduced in speed to be transmitted to the intermediate gear 52.

The first gear 53 is engaged with the intermediate gear 52. There is formed a clutch cam face 58 on a side of the first gear 53. There is formed a swing cam face 57 as a recess in a wall having the clutch cam face 58. The clutch cam face 58 is adapted to control of the engagement with the third gear 54, and consists of a projected portion 58*a* covering 9/10 of a circumference of the clutch cam face 58, and a recessed portion 58*b* beside the projected portion 58*a*. The third gear 54 is rotatably supported on a clutch arm 60, of which a distal end is contacted on the clutch cam face 58. The clutch arm 60 is secured on the shaft 36 of the fixer support device 35 in rotatable fashion.

The third gear 54 is engaged with the second gear 55 by the virtue of the clutch arm 60 in undetachable fashion. The clutch arm 60 is biased by a coil spring, to keep a cam follower end 60*a* of the clutch arm 60 in contact with the periphery of the clutch cam face 58. When the clutch arm 60 is contacted on the projected portion 58*a*, the third gear 54 is away from the first gear 53, and is disengaged from it. When the clutch arm 60 is contacted on the recessed portion 58*b*, the third gear 54 is engaged with the first gear 53, so that rotation of the first gear 53 is transmitted to the second gear 55 by the third gear 54. The recessed portion 58*b* is shaped to receive the cam follower end 60*a*, and allows the first gear 53 to come in engagement with the third gear 54. When the clutch cam face 58 comes to a rotational position for the recessed portion 58*b* to receive the cam follower end 60*a*, the fixer support device 35 starts half a rotation.

The gear proportion of the first gear 53 to the second gear 55 is such that the first gear 53 makes 1/10 of a rotation at the same time as the second gear 55 makes a half rotation. The fixer support device 35 is caused to make a half rotation via the half rotation of the second gear 55, to place the yellow fixing device 30 in the fixing station instead of the magenta fixing device 31. When the first gear 53 rotates to direct the projected portion 58*a* of the clutch cam face 58 to the clutch arm 60 instead of the recessed portion 58*b*, the clutch arm 60 is swung to disengage the first gear 53 from the third gear 54, to stop rotation of the second gear 55. When the first gear 53 makes one rotation, the frame device 40 comes down to the fixing station. The fixing devices 30 and 31 have finished being turned over or inverted.

Note that the fixer support device 35 and the frame device 40 have a click stop mechanism (not shown), which operates for stopping the fixer support device 35 from excessive rotation, that is, for stopping exactly at a half rotation. To rotate the fixer support device 35 newly by 180 degrees, torque is applied to the fixer support device 35 through the third gear 54 to an extent sufficient for releasing the fixer support device 35 from the retaining power of the click stop mechanism.

It is noted that the fixer support device 35 is disposed to position the fixing devices 30 and 31 close to the nip roller 23 of the transport roller pair 22. This is advantageous, because unfixable portions and/or irregularly fixed portions on the recording sheet 12 are decreased.

A cam follower 62, secured on the printer body 41, is engaged with the swing cam face 57 in the first gear 53. The cam follower 62 is stationary on the printer body 41 while the swing cam face 57 is swingable with the frame device 40. When the swing cam face 57 rotates in contact with the cam follower 62, the frame device 40 with the swing cam face 57 is swung in fashion relative to the cam follower 62, and between an advanced position of FIG. 3 and a retracted position of FIG. 4.

Note that there is a removing groove 63 formed to communicate with the swing cam face 57, and adapted to removal of the cam follower 62 from the swing cam face 57. When the frame device 40 is lifted with the cam follower 62 positioned at the removing groove 63, the frame device 40 can be swung up beyond the range where the cam follower 62 is relatively movable along the swing cam face 57. The removing groove 63 is used to remove the cam follower 62 from the swing cam face 57, for the purpose of renewal of the fixing lamps 30*a* and 31*a* while the frame device 40 is lifted.

Figure 5:
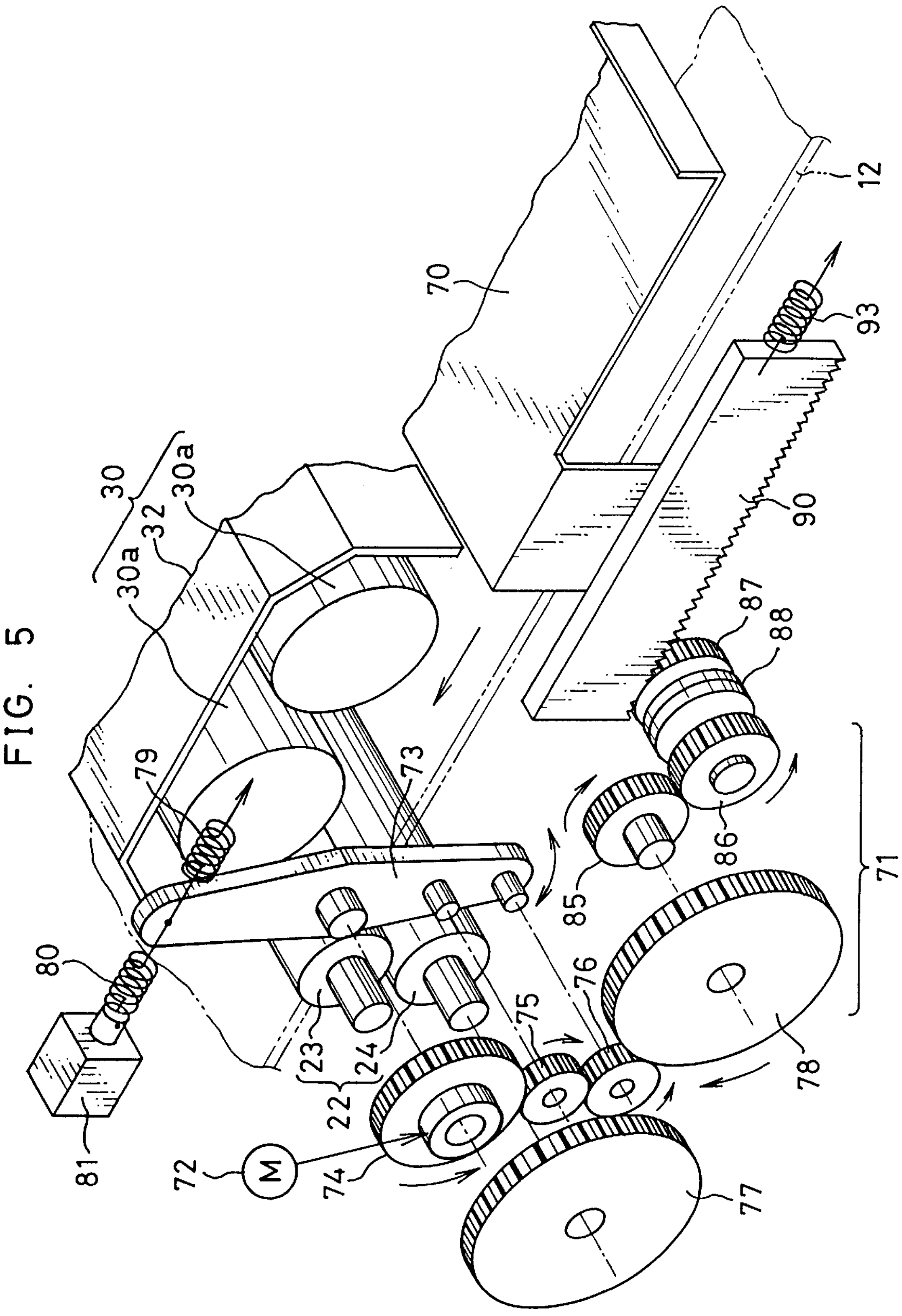
FIG. 5 is a perspective view illustrating a shutter mechanism of the thermal printer.

As shown in FIG. 5, a shutter plate 70 is disposed to be insertable into the fixing station so as to block out the ultraviolet rays from the fixing device 30 or 31 set in the fixing station. The shutter plate 70 is oriented parallel to the recording sheet 12, and is moved back and forth by a shutter drive mechanism 71 along the transport path of the recording sheet 12.

According to an embodiment, the speed of the shutter plate 70 in a direction to move into between the recording sheet 12 and the fixing device 30 or 31 in the fixing station, hereinafter referred to as a closing direction, is set equal to a transport speed V1 of the recording sheet 12. Therefore, it is possible to use a single motor 72 both for driving the shutter mechanism 71 and for rotating the rollers 10, 16, 17 and 24 of the transporting system for the recording sheet 12.

Figure 6:
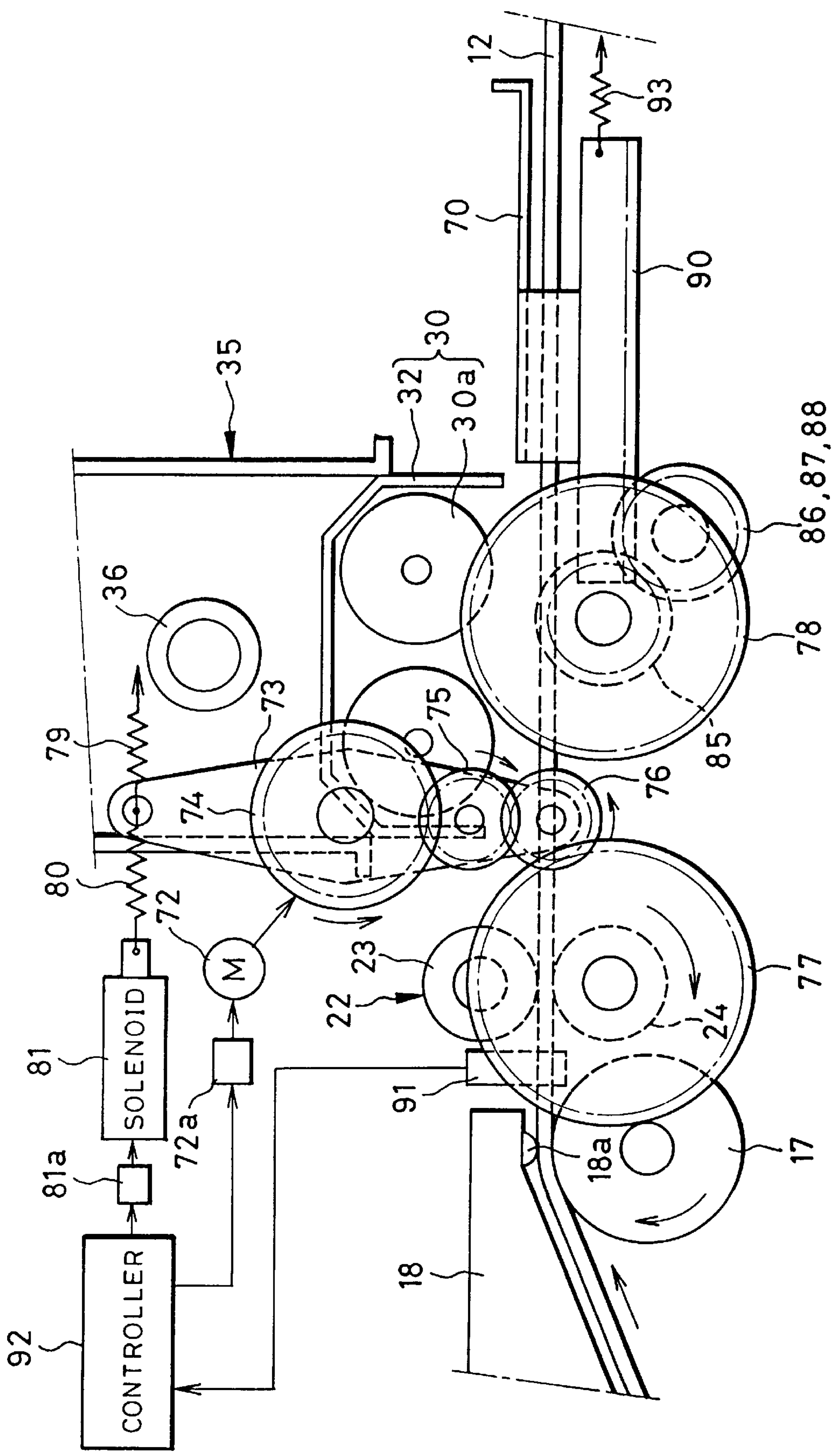
FIG. 6 is a side elevation illustrating a pair of feed rollers and the shutter mechanism in a thermal printing.

The power of the motor 72 is transmitted through interconnection gears 74 and 75 to a clutch gear 76 which are rotatably held on a clutch arm 73. The clutch arm 73 is biased to mesh with a transport gear 77 by a coiled spring 79, as is shown in FIG. 6. Thus, the power of the motor 72 is usually transmitted to the transport gear 77. The transport gear 77 is securely and coaxially coupled to the driving roller 24 of the second transport roller pair 22. The motor 72 is also coupled to the feed roller 10, the platen roller 17 and the driving roller 16 of the first transport roller pair 14 through not-shown transmission mechanisms.

The clutch arm 73 is also coupled to a solenoid 81 through a coiled spring 80 such that the clutch gear 76 is brought into mesh with a shutter drive gear 78 when the solenoid 81 is turned on. The shutter drive gear 78 is coaxially coupled to a first transmission gear 85, and a second transmission gear 86 meshes with the first transmission gear 85. A pinion 87 is rotatably and coaxially coupled to the second transmission gear 86 through a torque limiter 88. The pinion 87 meshes with a rack 90 which is movable back and forth along a not-shown guide member in parallel to the transport path of the recording sheet 12. The shutter plate 70 is securely connected to the rack 90. Accordingly, when the solenoid 81 is turned on, the power of the motor 72 is transmitted through the shutter gear 78, the transmission gears 85 and 86, and the pinion 87, to cause the shutter plate 70 to move in the closing direction.

When the shutter plate 70 is closed at the fixing device 30, the torque limiter 88 is activated to make the second gear 86 idle, and the pinion 87 comes to a stop to fix the rack 90 in this position. The gear ratios between the gears 85, 86, 87 and 90 are determined such that the speed of the rack 90 is equal to the transport speed V1 of the recording sheet 12 by the driving roller 24. Thus, the shutter plate 70 moves at the same speed as the transport speed, without the need for a special control of the speed of the motor 72.

Figure 7:
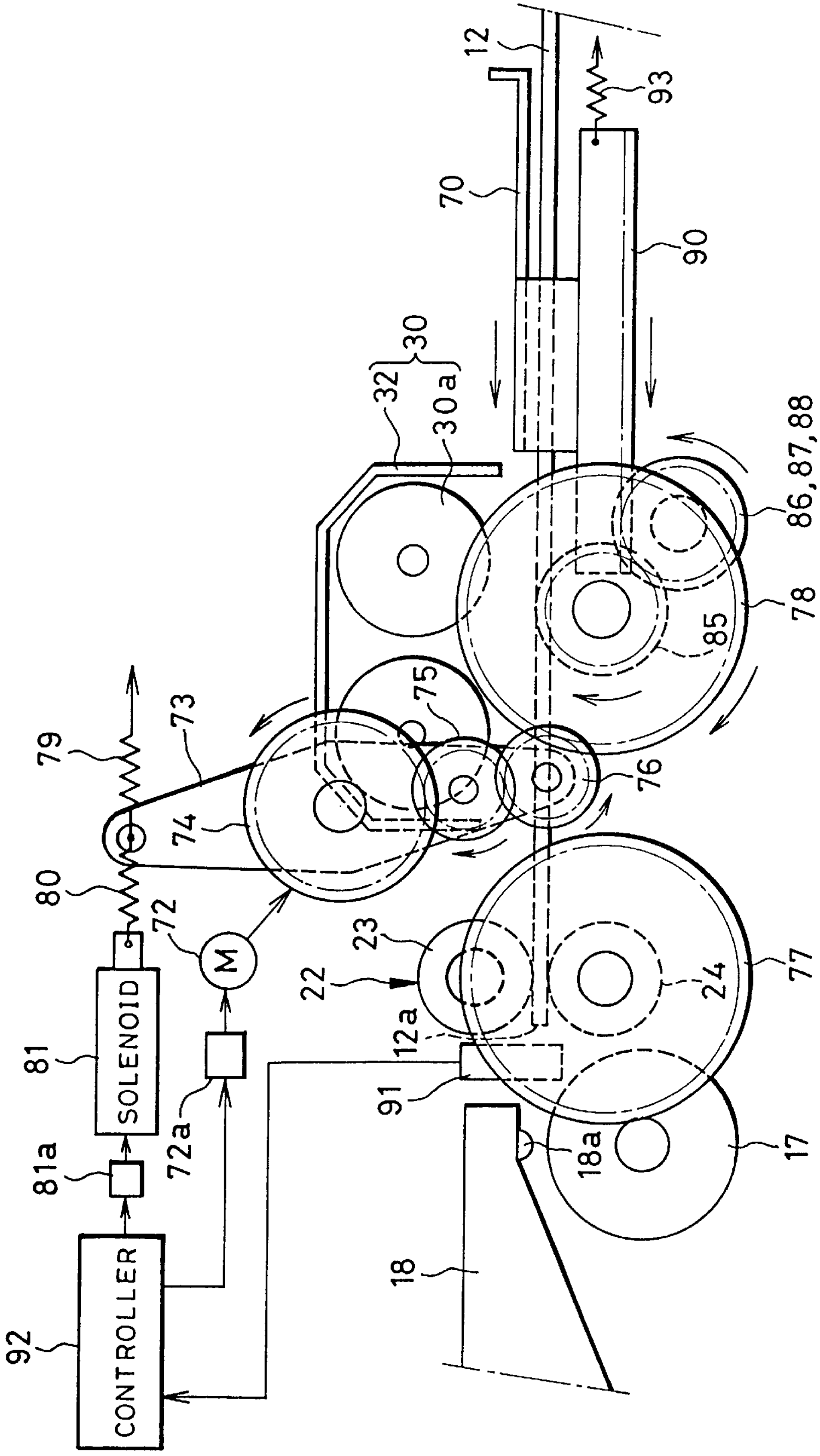
FIG. 7 is a side elevation illustrating the feed rollers and the shutter mechanism at the start of optical fixation of the color thermosensitive recording sheet.

As shown in FIGS. 6 and 7, an edge sensor 91 is disposed between the thermal head 18 and the second roller pair 22. The edge sensor 91 is constituted of a light projector and a light receptor, as is conventional, and outputs a detection signal to a controller 92 when it detects a trailing edge 12*a* of the recording sheet 12 moving in a forward direction from the thermal head 18 to pass through the fixing station. The controller 92 may be a microcomputer which sequentially controls respective sections of the thermal printer, including a control to the shutter plate 70 based on the detection signal from the edge sensor 91. That is, the moment when the trailing edge 12*a* of the recording sheet 12 in the forward direction is detected, the controller 92 turns the solenoid 81 on through a driver 81*a*. Thus, the shutter plate 70 starts to be closed, as soon as the recording sheet 12 stops being transported.

While the shutter plate 70 is being closed, the optical fixing device 30 for yellow continues to project ultraviolet rays onto the recording sheet 12. As the shutter plate 70 is closed at the same speed as the transport speed of the recording sheet 12, the whole area of an end portion of the recording sheet 12, which stops under the fixing device 30, is exposed to the fixing light for the same time duration as the preceding portion of the recording sheet.

Figure 8:
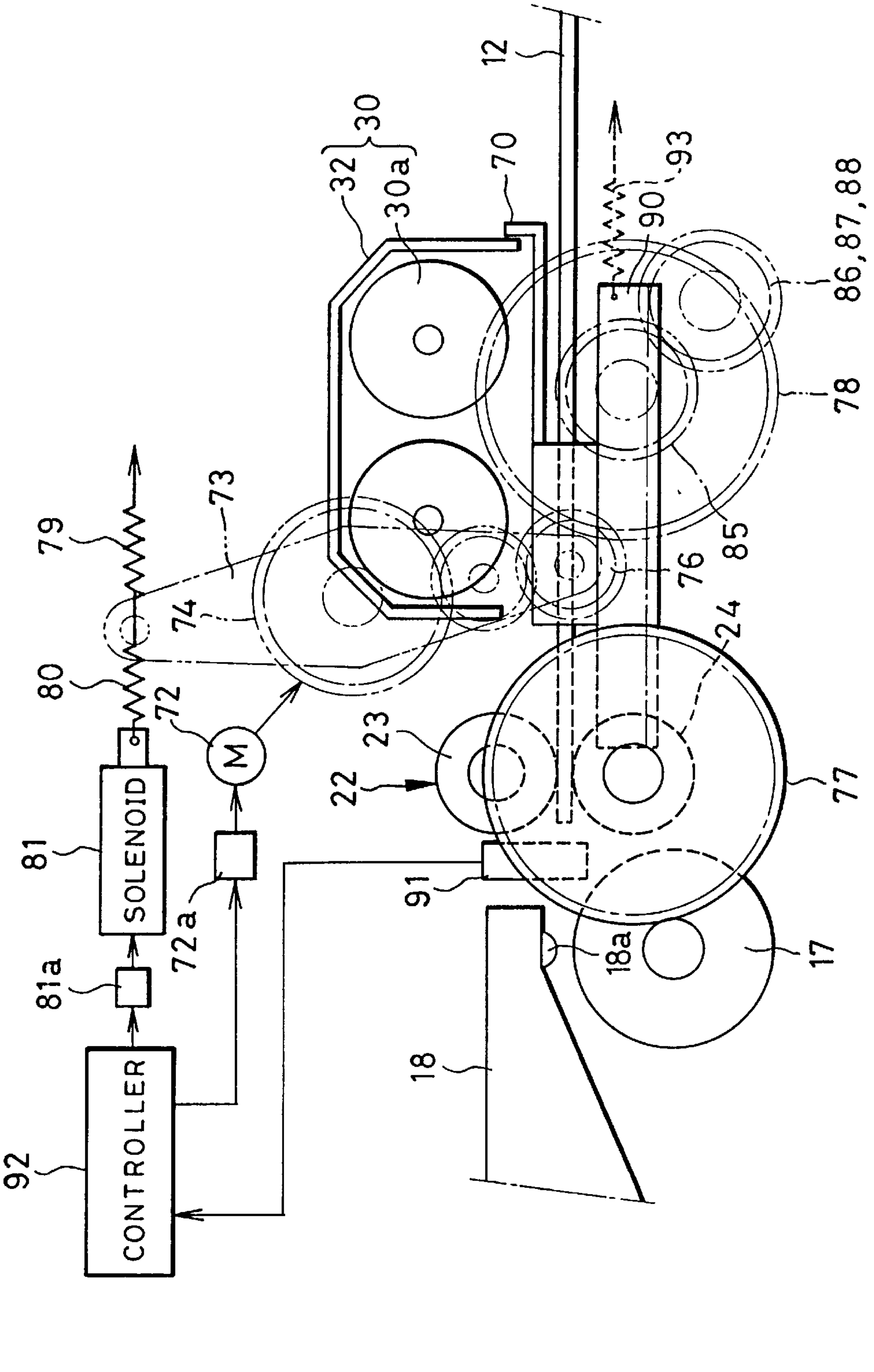
FIG. 8 is a side elevation illustrating the feed rollers and the shutter mechanism in the end of the optical fixation.
Figure 20:
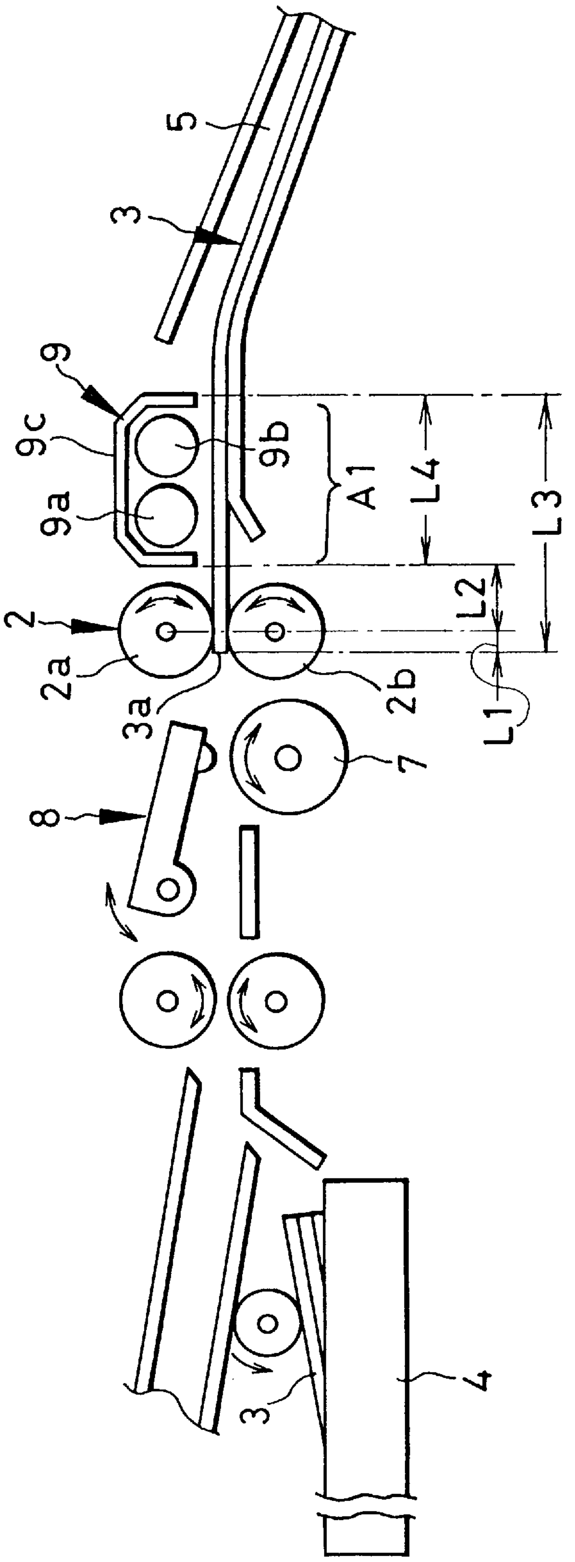
FIG. 20 (PRIOR ART)
FIG. 20 is an explanatory view illustrating a conventional color thermal printer.
Figure 21A:
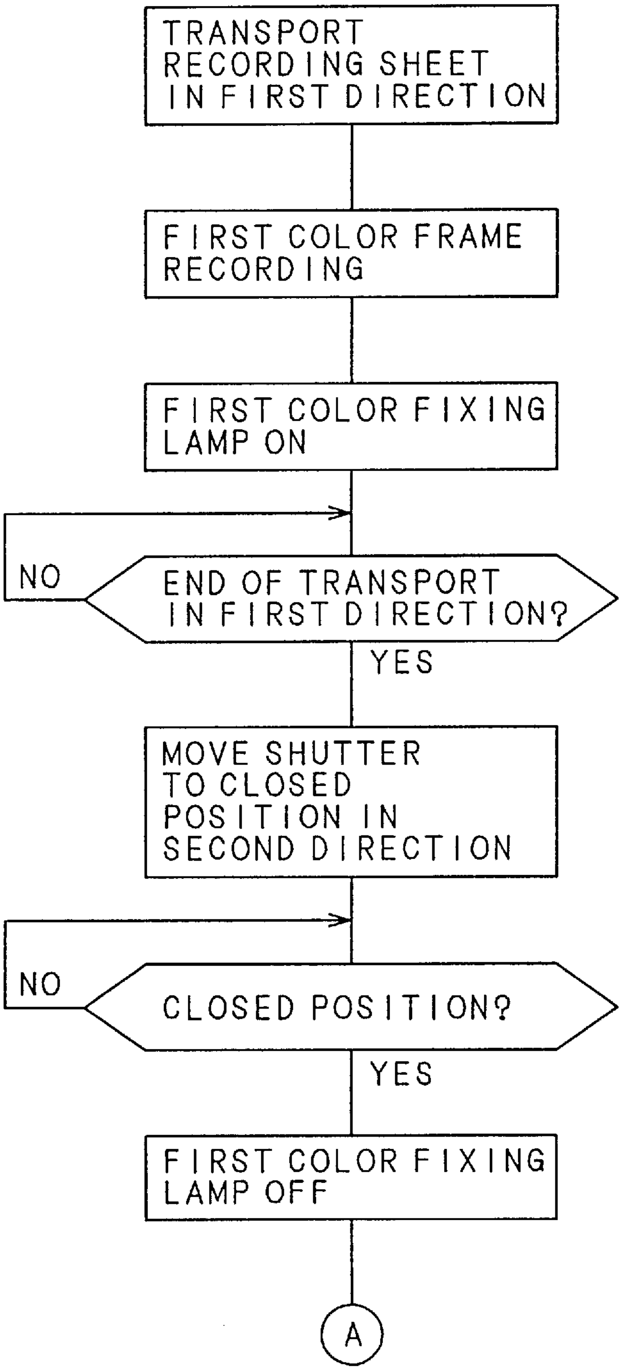
FIGS. 21A, 21B, 22 and 23 depict the method steps for printing a full—color image according to an embodiment of the present invention.
Figure 21B:
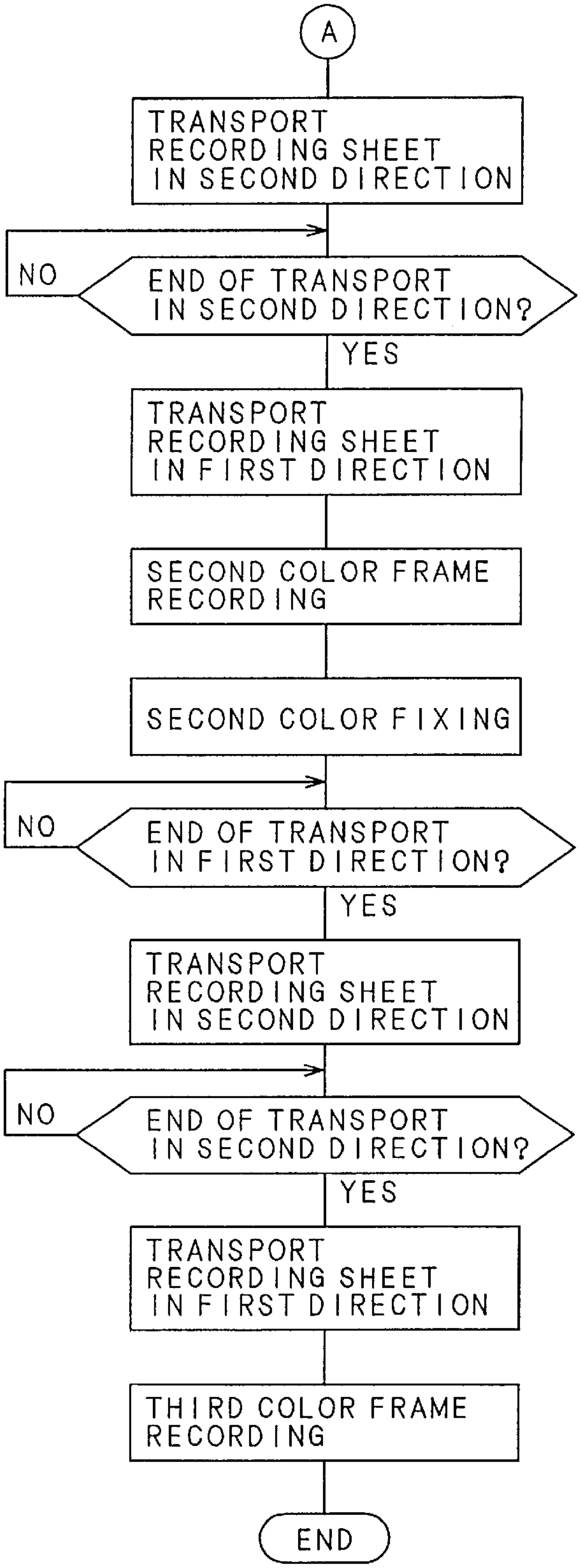
Figure 22:
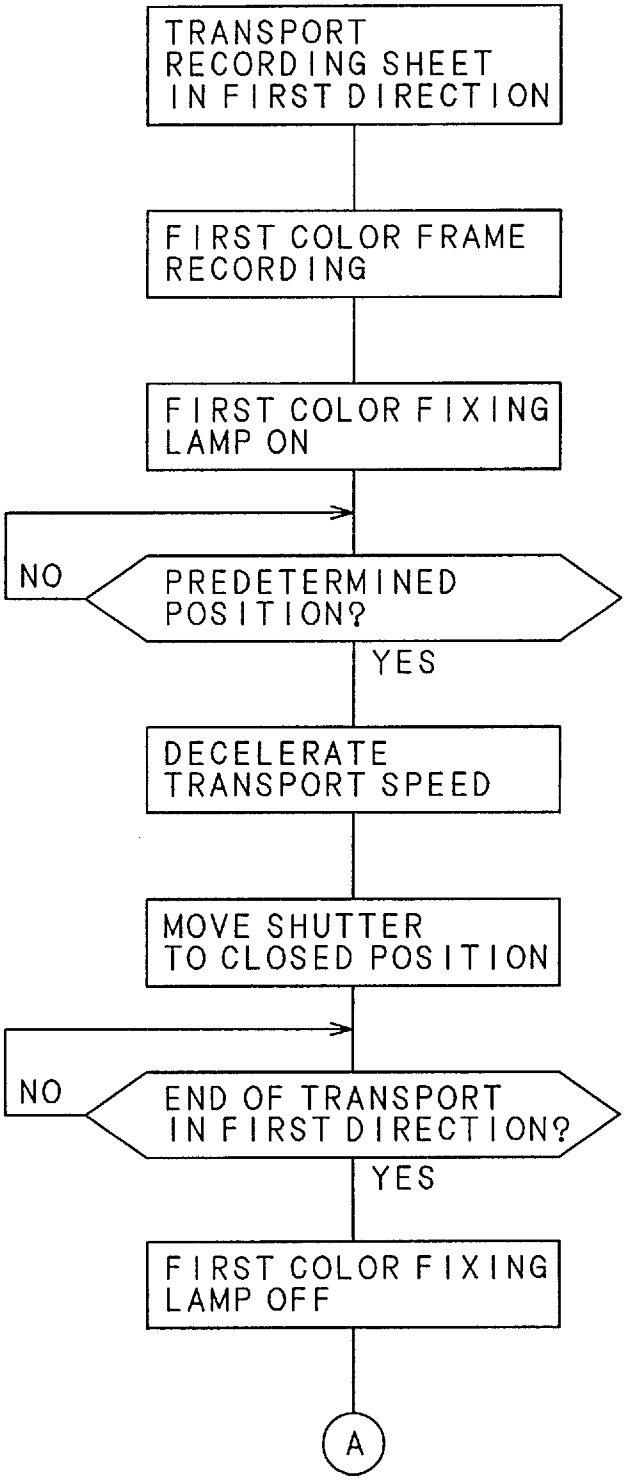
Figure 23:
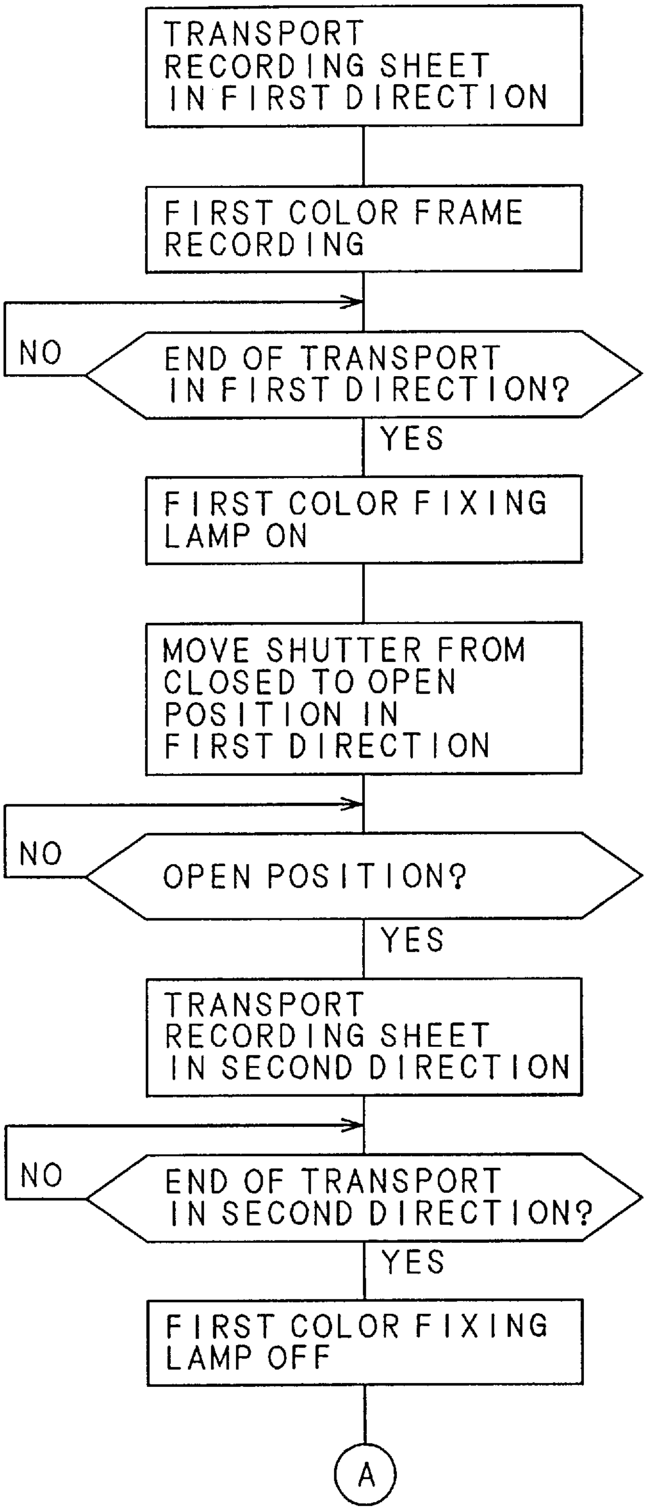

Since the intensity of fixing light is approximately equalized by the reflection plate 32, the amount of fixing light projected onto the end portion becomes substantially equal in the whole area thereof as if the recording sheet 12 was transported farther in the forward direction at the constant speed to pass the end portion through the fixing station. Accordingly, in the end of fixation when the shutter plate 70 completely close the yellow fixing device 30, as shown in FIG. 8, the end portion, that corresponds to the is closed at the recording sheet 3 in FIG. 20, is uniformly fixed to the same and proper extent as the preceding portion of the recording sheet 12. For easy understanding, the fixing device 30, the shutter plate 70 and the rack 90 are shown by solid lines in FIG. 8, whereas the shutter drive mechanism 71 is shown by dashed lines.

Consequently, the available area of the recording sheet 12 is increased by the end portion L4 compared with the conventional back-and-forth moving type thermal printer shown in FIG. 20. In other words, only a small portion, which corresponds to the range L1+L2 in FIG. 20, is required to remain as an imageless margin.

It is to be noted that the shutter plate 70 needs not to be activated for the magenta fixing, because the magenta fixing device 31 is used for bleaching, and the magenta fixing light or ultraviolet rays from the magenta fixing lamps 31*a* have no bad effect on the recording sheet 12 in this stage. On the contrary, an excessive amount of yellow fixing ultraviolet rays from the yellow fixing lamps 30*a* could damage the magenta recording layer 27 because of its minor component in the wavelength range around 365 nm.

A predetermined time later than the detection signal from the edge sensor 91, which is enough to complete close the shutter plate 70, the controller 92 turns the motor 72 and the solenoid 81 off respectively through drivers 72*a* and 81*a*, and then turns the yellow fixing lamps 30*a* off. When the solenoid 81 is off, the clutch gear 73 is brought back into mesh with the transport gear 77 under the force of the spring 79. Also the rack 90 is moved back under the force of a spring 93 which biases the rack 90 in a direction to remove the shutter plate 70 from the fixing device 30.

Operation of the above embodiment is described now.

When a start switch is manually operated, the transport motor 72 is driven to rotate the feeding roller 10. Thus, an uppermost one of the recording sheets 12 in the sheet supply tray 11 is fed through the sheet supply path 13 toward the first transport roller pair 14. A front edge of the recording sheet 12 comes between the nip roller 15 and the drive roller 16 of the transport roller pair 14, which responsively squeeze the recording sheet 12 and transport it to the thermal head 18.

The recording sheet 12 passed between the thermal head 18 and the platen roller 17 is transported to the transport roller pair 22, where the nip roller 23 and the drive roller 24 squeeze the recording sheet 12. The thermal head 18 rotates about the shaft 20 clockwise, to press the heating elements 18*a* against the recording sheet 12 on the platen roller 17. Then the transport roller pair 14 is released from squeezing the recording sheet 12.

The recording sheet 12 is transported in the forward direction by the second transport roller pair 22, until a front edge of a recording area of the recording sheet 12 comes to the heating elements 18*a*. The heating elements 18*a* are driven to generate heat energy at values determined for pixels, to record a yellow image line after line thermally to the yellow coloring layer 28.

To record one pixel, the heating elements 18*a* supplies the recording sheet 12 with bias heat energy and image heat energy is: the bias heat energy determined slightly short of coloring of the yellow coloring layer 28, and the image heat energy is determined at an amount changed according to the coloring density of the image.

In synchronism with the yellow recording, the yellow fixing lamps 30*a* are turned on. The yellow fixing lamps 30*a* apply near ultraviolet rays of approximately 420 nm to the recording sheet 12, to fix the yellow coloring layer 28 for avoidance of yellow coloring in the recording of the magenta coloring layer 27.

The yellow image is recorded at a rear end of a recording area of the recording sheet 12, as viewed in the forward direction of its movement. Thereafter when the edge sensor 91 detects the rear edge 12*a* of the recording sheet 12, the solenoid 81 is turned on to swing the clutch arm 73 in a direction to remove the clutch gear 76 from the transport gear 77 and bring it into mesh with the shutter gear 78, as is shown in FIGS. 5 and 7. Then, the motor 72 is disconnected from the transport roller pair 22 to stop the recording sheet 12. The power of the motor 72 is transmitted to the pinion 87 through the clutch gear 76, the transmission gears 85 and 86 and the shutter gear 78, causing the rack 90 and the shutter plate 70 to move in the closing direction at the same speed as the transport speed of the recording sheet 12.

While the shutter plate 70 is being closed, the yellow fixing device 30 continues to project ultraviolet rays of about 420 nm. As the shutter plate 70 is closed at the same speed as the transport speed of the recording sheet 12, the whole area of an end portion of the recording sheet 12, which stops under the fixing device 30, is exposed to the fixing light for the same time duration as the preceding portion of the recording sheet 12 by the end of shutter closing operation when the shutter plate 70 completely closes at the yellow fixing device 30, as is shown in FIG. 8. Thus, the whole area of the end portion is fixed to the same extent as the preceding portion.

The predetermined time later than the detection signal from the edge sensor 91, the controller 92 turns the motor 72, the solenoid 81 and the yellow fixing lamps 30*a* off. When the solenoid 81 is off, the clutch gear 73 is brought back into mesh with the transport gear 77. Also the rack 90 is moved back by the force of the spring 93 to remove the shutter plate 70 from the fixing device 30.

Then, the thermal head 18 is rotated counterclockwise about the shaft 20, and released from the platen roller 17. Thereafter, the motor 72 is rotated reversely to rotate the drive roller 24 of the second roller pair 22 reversely, thereby transporting the recording sheet 12 in a reverse direction.

While the recording sheet 12 is moved in the reverse direction, the fixing devices 30 and 31 are turned over. As illustrated in FIG. 3, the motor 50 is rotated in the counterclockwise direction. The rotation is transmitted to the first gear 53 by the intermediate gear 52, to rotate the first gear 53 clockwise. Upon the start of the rotation, the cam follower 62 is pressed by the swing cam face 57, to start swinging the frame device 40, from the advanced position of FIG. 3 to the retracted position of FIG. 4.

With the frame device 40 in the retracted position, a distal end of the clutch arm 60 is detached from the projected portion 58*a* of the clutch cam face 58, and contacted on the recessed portion 58*b*. The first gear 53 comes in mesh with the third gear 54, to rotate the second gear 55 in the clockwise direction. The fixer support device 35 is caused to make half a rotation, to set the magenta fixing device 31 in the fixing station instead of the yellow fixing device 30. The rotation of the first gear 53 directs the projected portion 58*a* of the clutch cam face 58 to the clutch arm 60 instead of the recessed portion 58*b*. The clutch arm 60 is swung to disengage the first gear 53 from the third gear 54, to stop the second gear 55. The first gear 53 makes one rotation. The frame device 40 comes down to the fixing station. The fixing devices 30 and 31 have finished being turned over.

The recording sheet 12 is transported in the forward direction, until the front edge of the recording area of the recording sheet 12 comes to the heating elements 18*a*. Then, the transport roller pair 22 is temporarily stopped. The thermal head 18 is swung down to stand by. The transport roller pair 22 rotates in the forward direction, to transport the recording sheet 12 in the forward direction. The heating elements 18*a* are driven to generate heat energy determined for a magenta image, to record the magenta image thermally to the magenta coloring layer 27. In synchronism with the magenta recording, the magenta fixing lamps 31*a* are turned on. The magenta fixing lamps 31*a* apply near ultraviolet rays of approximately 365 nm to the recording sheet 12, to fix the magenta coloring layer 27 for avoidance of magenta coloring in the recording to the cyan coloring layer 26.

When the whole recording area of the recording sheet 12 is sufficiently fixed and bleached by being exposed to the magenta fixing light for a sufficient time, the magenta fixing lamps 31*a* are turned off. Simultaneously, the motor 72 and the solenoid 81 are turned off.

Then the thermal head 18 is rotated counterclockwise about the shaft 20, to remove from the platen roller 17. The transport roller pair 22 is stopped temporarily. Similarly to the yellow recording, the transport roller pairs 14 and 22 are responsively started rotating in the reverse direction.

The recording sheet 12 is transported, until the front edge of the recording area of the recording sheet 12 comes to the heating elements 18*a*. The thermal head 18 is swung down to stand by. The transport roller pairs 14 and 22 rotate, to transport the recording sheet 12 in the forward direction. The heating elements 18*a* record the cyan image thermally to the cyan coloring layer 26. In synchronism with the cyan recording, the magenta fixing lamps 31*a* are turned on again for the purpose of bleaching it, till the end of the recording to the cyan coloring layer 26.

After three color images have been recorded on the coloring layers, the transport roller pair 22 continues to rotate to send the recording sheet 12 to an exit path 65. The recording sheet 12 in the exit path 65 is moved by not-shown exit rollers out to a reception tray. The linking device 43 is swung again. The yellow fixing lamps 30*a* are set in the fixing station instead of the magenta fixing lamps 31*a*.

The fixing lamps 30*a* and 31*a* may be renewed, when degraded or involved in breakdowns in operation. For the renewal of the fixing lamps 30*a* and 31*a*, a not-shown keyboard is manually operated to set a lamp renewing mode. At first in the lamp renewing mode, the motor 50 in FIG. 3 is rotated at such a predetermined amount as to position the removing groove 63 of the first gear 53 rotationally at the cam follower 62. Then the frame device 40 is lifted to disengage the cam follower 62 from the swing cam face 57. The frame device 40 is further lifted to move the fixing lamps 30*a* and/or 31*a* to a more largely open space, where the fixing lamps 30*a* and 31*a* can be removed with great easiness.

Figure 9:
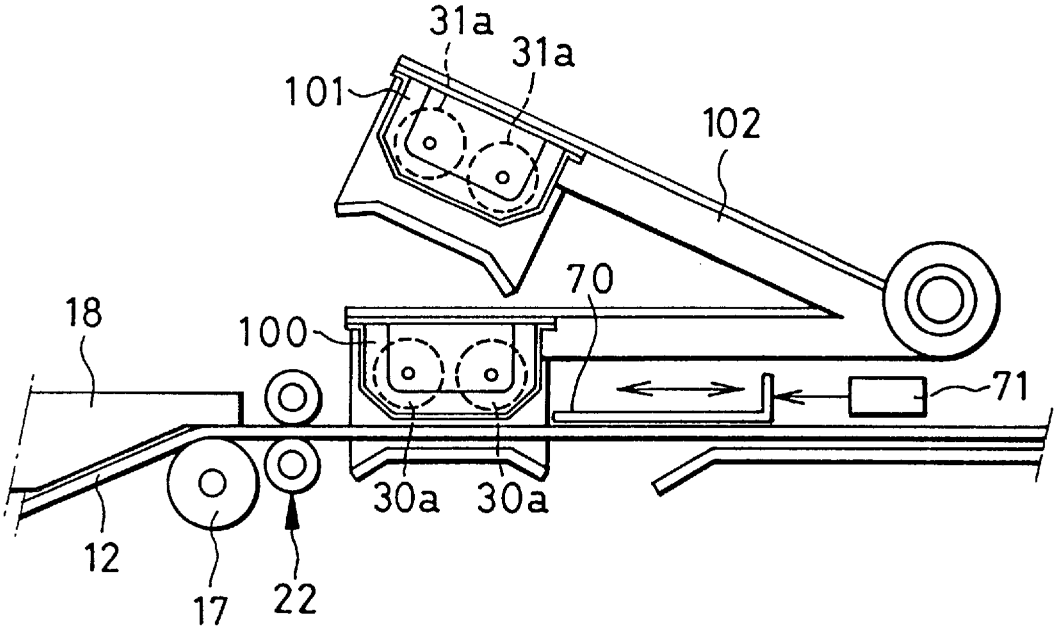
FIG. 9 is a side elevation illustrating a state where a swingable yellow fixing device of another preferred printer fixes the yellow coloring layer.
Figure 10:
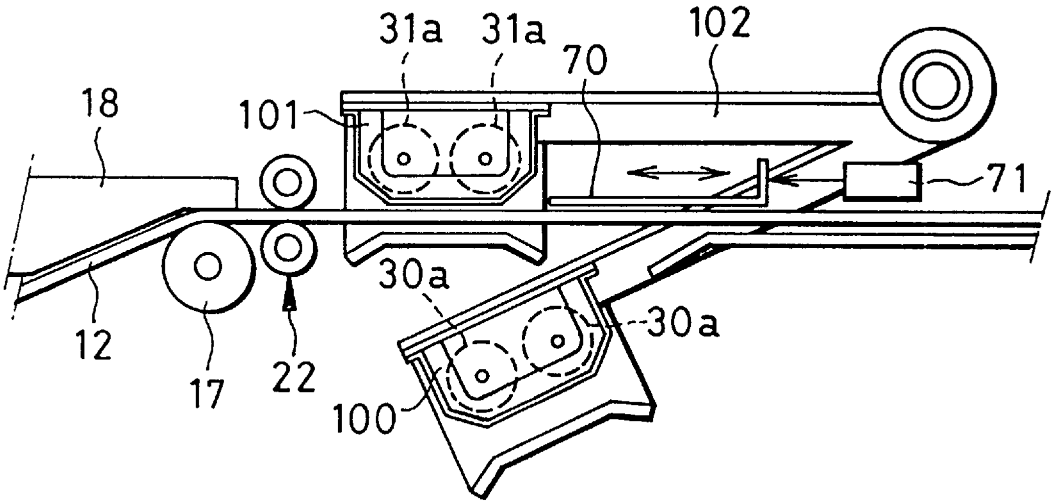
FIG. 10 is a side elevation illustrating a state where a magenta fixing device of the printer of FIG. 9 fixes the magenta coloring layer.

Instead of the above-described alternative positioning unit 45 having the fixer support device 35 and the frame device 40, it is possible to use an alternative positioning unit as shown in FIGS. 9 and 10. In this unit, fixing devices 100 and 101 are mounted on a V-shaped fixer support device 102. When the fixer support device 102 is swung at a predetermined angle, the fixing devices 100 and 101 are selectively set in the fixing station.

Figure 11:
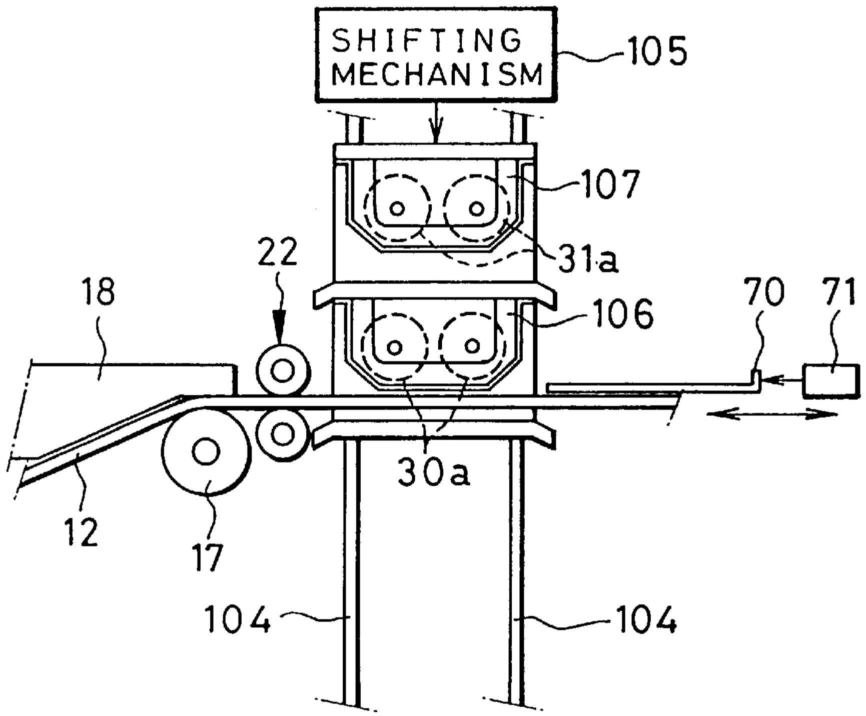
FIG. 11 is a side elevation illustrating a state where a slidable yellow fixing device of another preferred printer fixes the yellow coloring layer.
Figure 12:
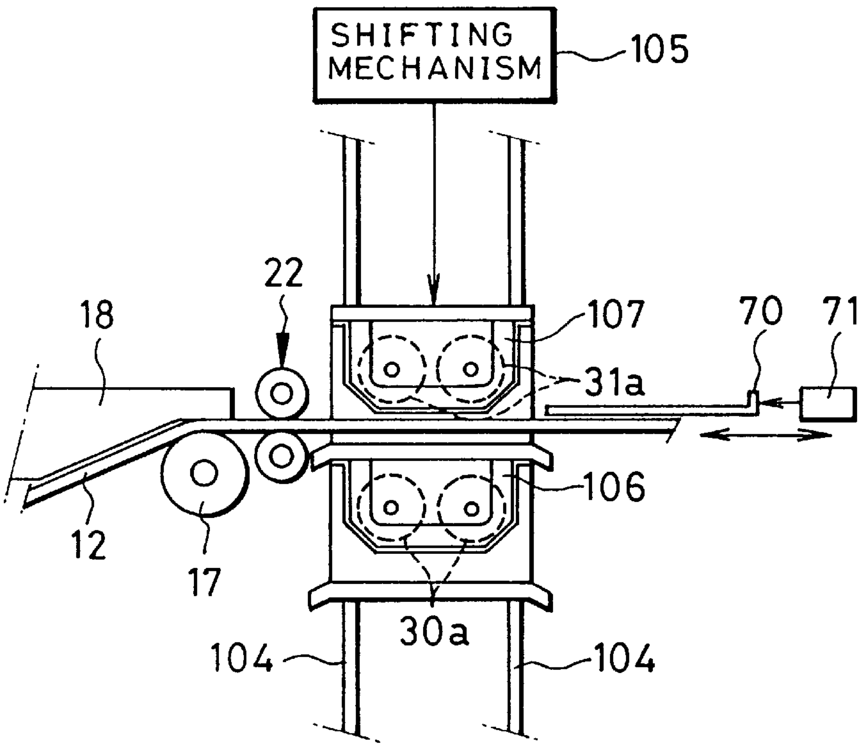
FIG. 12 is a side elevation illustrating a state where a magenta fixing device of the printer of FIG. 11 fixes the magenta coloring layer.

According to another embodiment shown in FIGS. 11 and 12, fixing devices 106 and 107 are supported on guide bars 104 and shifted by a shifting mechanism 105. The fixing devices 106 and 107 are raised and lowered by the shifting mechanism 105, and selectively set in the fixing station.

It is also possible to provide the shutter plate 70 and the shutter drive mechanism 71 in combination with the conventional optical fixing device 9 as shown in FIG. 20.

For closing the shutter plate 70, an electromagnetic clutch may be used in place of the mechanical clutch having the clutch lever 73 and the clutch gear 76.

Note that each of the fixing devices 30, 31, 100, 101, 105 and 106 has the two fixing lamps 30*a* or 31*a* in the above embodiment, but can have one, or three or more fixing lamps.

In the above embodiment, the clutch mechanism as transmission mechanism is constituted of a clutch cam constructed in simply mechanical fashion. However it is alternatively possible to use an electromagnetic clutch for causing the fixer support device 35 to make a 180 degree rotation when the frame device 40 has the retracted position.

It is also possible to use an intermittently toothed mechanism for transmitting rotation in intermittent fashion to the fixer support device 35.

Although the motor 72 is used both for sheet transporting and for driving the shutter drive mechanism 71 in the embodiment shown in FIG. 5, it is possible to use respective motors. The clutch 73, the gears 76, 74, 75, 78, 85 and 86, and the torque limiter 88 are unnecessary for this embodiment. It is preferable to use a step motor as the shutter drive motor because the position and the speed of the shutter plate 70 may be controlled based on the number of steps of the step motor. Using a step motor as the sheet transporting motor is also preferable, because it permits omitting the edge sensor 91 by monitoring the position of the recording sheet 12 with reference to the number of steps of the step motor.

Figure 13:
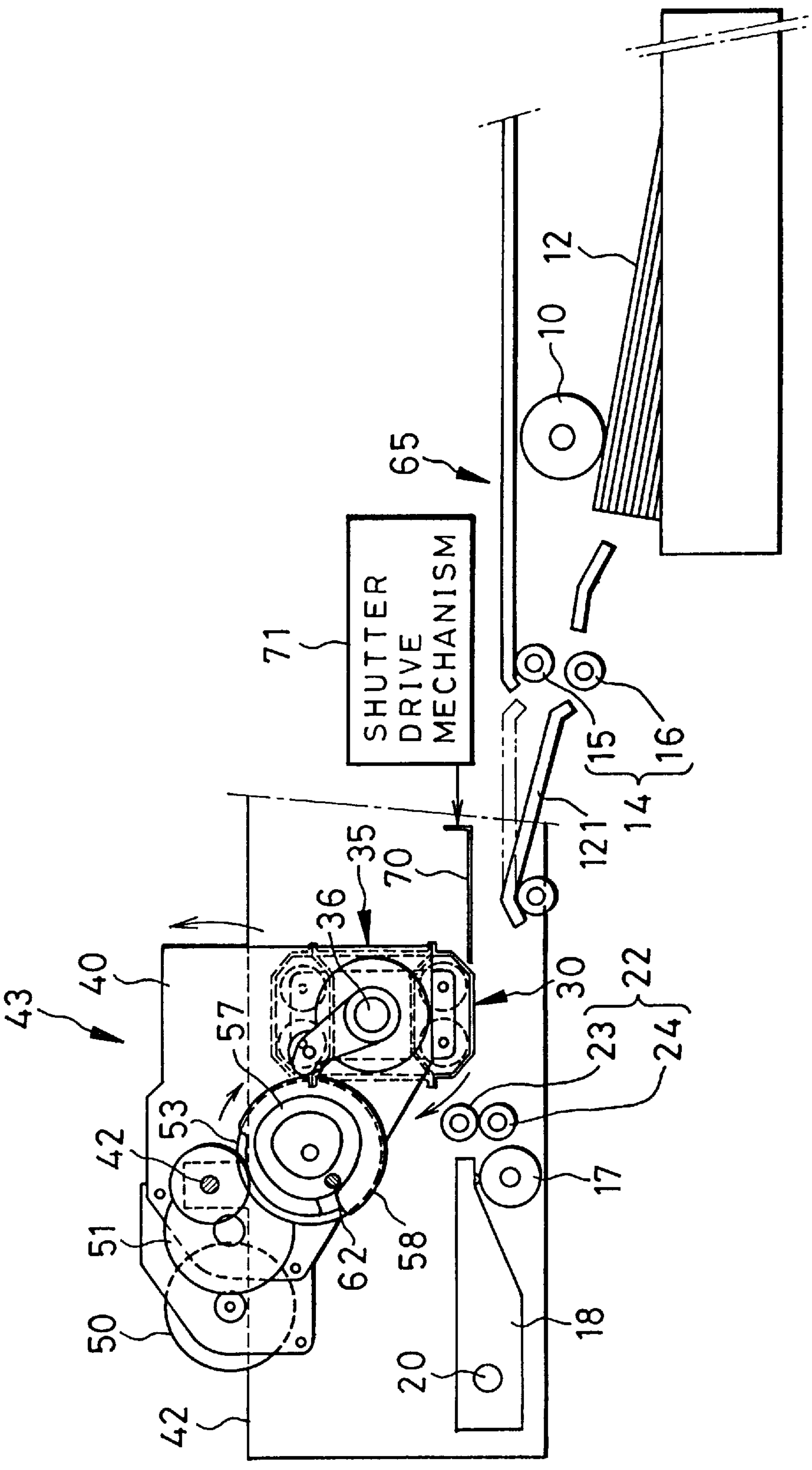
FIG. 13 is an explanatory view in elevation, illustrating another preferred thermal printer of which a sheet supply tray is disposed differently with reference to the thermal head and the fixing devices.

In the above embodiment, the thermal head 18 lies between the fixing station and the supply tray 11 as illustrated in FIG. 1. Alternatively the thermal head 18 can lie between a fixing station and a supply tray 80, as illustrated in FIG. 13. Elements similar to those of the above embodiment are designated with identical reference numerals. Reference numeral 121 designates a swingable guide plate, which is swung down in a supply position, where the recording sheet 12 is supplied from the sheet supply tray 120 to the thermal head 18. The swingable guide plate 121 is swung up in an exit position, where the recording sheet 12 is directed from the thermal head 18 toward a reception tray.

At first in operation, the swingable guide plate 121 is set in the supply position. The recording sheet 12 is fed from the sheet supply tray 120. As soon as the recording sheet 12 comes into a printing start position where a rear end of the recording sheet 12 in the supply direction is nipped between a pair 22 of transport rollers 23 and 24, the transport mechanism is all stopped, and the guide plate 121 is set in the exit position.

The recording sheet 12 is transported in the forward direction from the thermal head 18 to the optical fixing device 30, to record and fix a yellow image to the yellow coloring layer 28. In the end of the yellow fixation when the recording sheet 12 stops, the shutter plate 70 is inserted between the fixing device 30 and the recording sheet 12 in the same way as above. After the yellow fixation, the recording sheet 12 is transported in the reverse direction, to set it in the printing start position again. A magenta image is recorded and fixed to the magenta coloring layer 27. Then a cyan image is recorded to the cyan coloring layer 26.

It is to be noted that a stationary guide plate may be used instead of the swingable guide plate 121. The stationary guide plate should make such an angle with an exit path that, after an entire length of the recording sheet 12 comes out of the stationary guide plate, the recording sheet 12 is prevented from being directed to the supply tray 120, and is necessarily guided toward the receptacle tray.

In the above embodiments, the thermal recording and the fixation are effected in parallel in course of transporting the recording sheet 12 in the forward direction. Alternatively, the fixation may be effected during transportation in the reverse direction after the thermal recording being effected during transportation in the forward direction. In this alternative, the fixing device 30 is maintained off while the recording sheet 12 is transported in the forward direction, and the shutter plate 70 is previously set in the closed position. First when the recording sheet 12 is stopped upon detection of the rear edge 12*a* by the edge sensor 91, the fixing device 30 is turned on and the shutter plate 70 begins to open. As soon as the fixing device 30 is fully opened, the recording sheet 12 starts to be transported in the reverse direction, while the fixing device 30 keeps projecting the fixing light. In this way, the recording sheet 12 is uniformly and properly fixed even in the rear end portion which stops under the fixing device 30 and cannot pass through the fixing station.

Also, the fixation may be effected in both forward and reverse directions. In this case, the shutter plate 70 is closed and then opened at the same speed as the sheet transport speed while the recording sheet 12 stops in the position as shown in FIG. 1 or 4. The yellow fixing device 30 continues to project the fixing light from the start of the initial forward transportation to the end of the following reverse transportation of the recording sheet 12. Then, the yellow fixing device 30 is replaced by the magenta fixing device 31.

Figure 14:
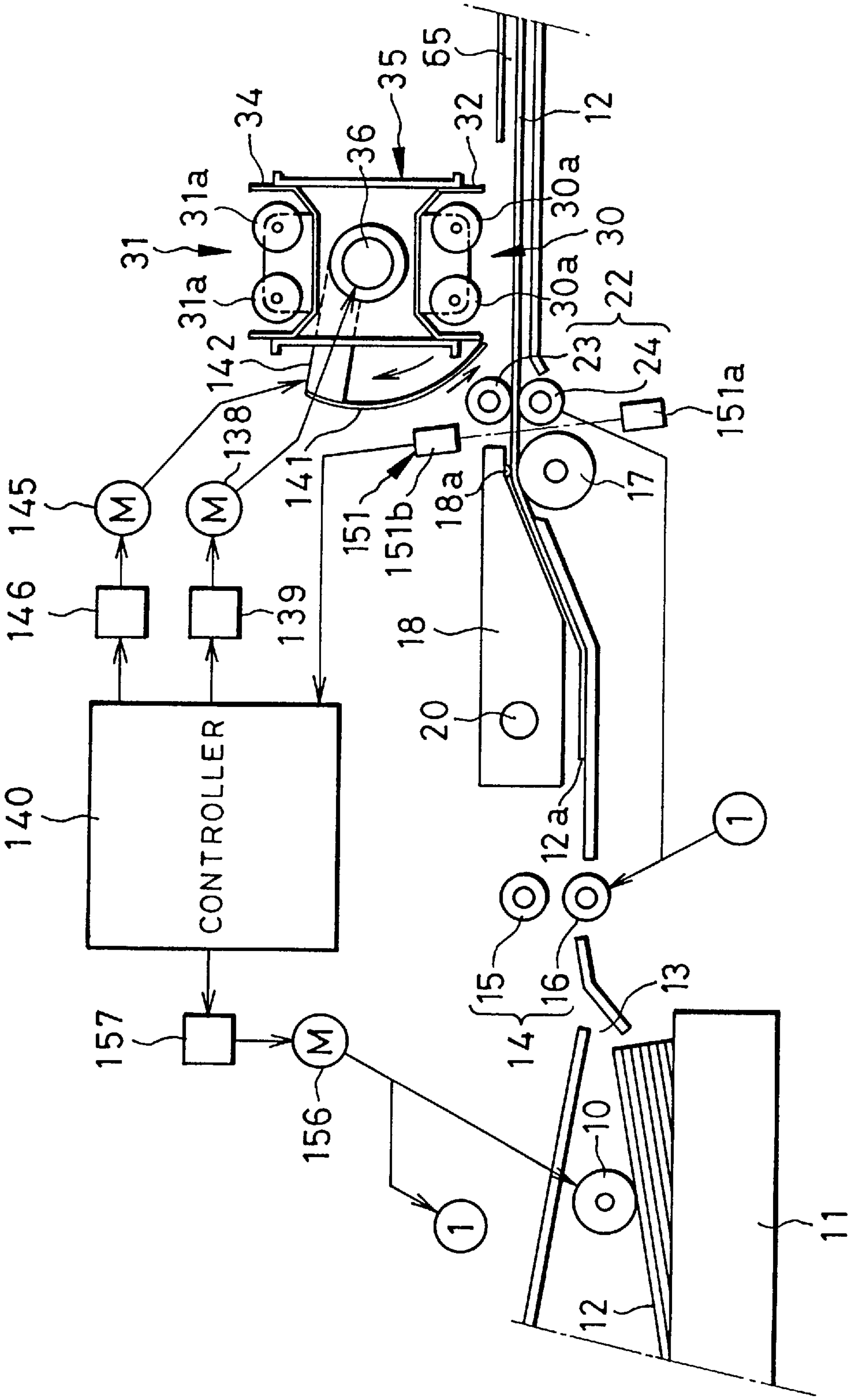
FIG. 14 is an explanatory view in elevation, illustrating another preferred shutter mechanism having a swingable shutter plate.

FIG. 14 shows essential parts of another preferred embodiment of a thermal printer, wherein a fixer support device 35 supporting yellow and magenta fixing devices 30 and 31 is mounted on a not shown frame in a rotatable fashion about a shaft 36. The fixing devices 30 and 31 are rotationally symmetrical with each other about the shaft 36. The shaft 36 is coupled to an inverting motor 138 for rotating the fixer support device 35 by an angle of 180 degrees at a time to set one of the fixing devices 30 and 31 in a fixing station facing a transport path of a recording sheet 12. The inverting motor 138 is driven by a motor driver 139 which is controlled by a controller 140. The fixing devices 30 and 31 may be equivalent to those of the above embodiments.

A shutter plate 141 is mounted to the shaft 36 through a connection arm 142, so as to be rotatable about the shaft 36 independently of the fixer support device 35. The shutter plate 141 is curved at a radius of curvature which is equal to a radius of a circular path of the shutter plate 141 around the shaft 36.

Figure 15:
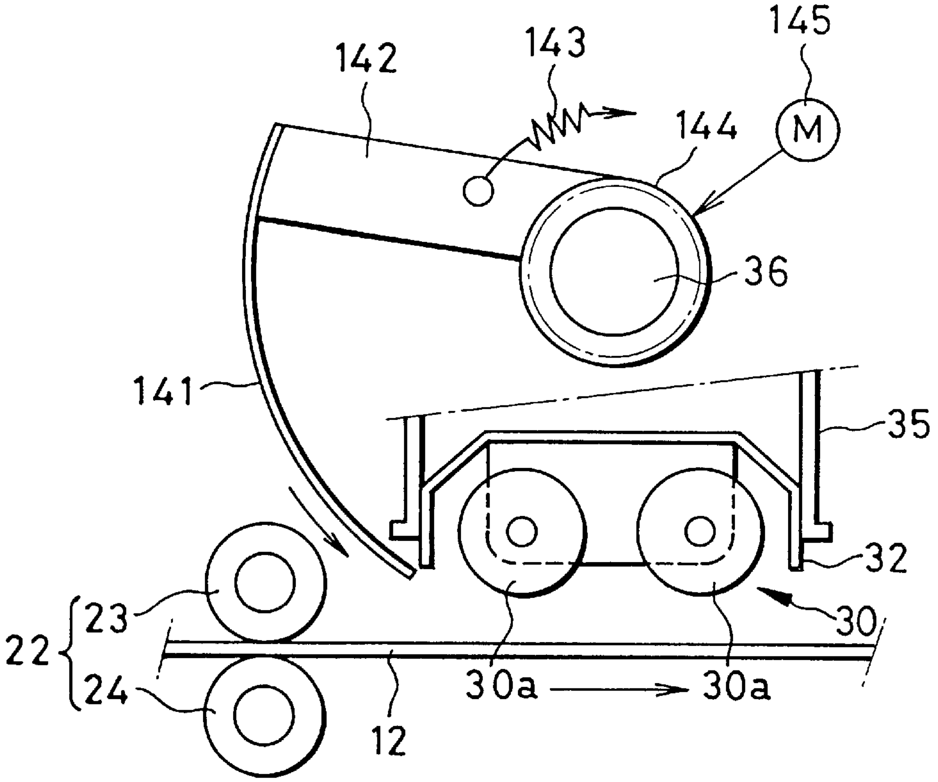
FIG. 15 is a side elevation illustrating a state where the shutter plate is opened in the thermal printer of FIG. 14.

As shown in FIG. 15, the shutter plate 141 is biased to move in a clockwise direction by a coiled spring 143. A rotary gear 144 is secured to the connection arm 142, and a shutter drive motor 145 is coupled to the rotary gear 144 through a not shown clutch, e.g. an electromagnetic clutch. Also the shutter drive motor 145 is controlled by the controller 140 through a motor driver 146.

The controller 140 may be a microcomputer which sequentially controls respective sections of the thermal printer, including a thermal head 18 and a recording sheet transporting system. Since the thermal head 18 and the recording sheet transporting system may have the same construction as the above described embodiments, the following description relates to merely those members which are necessary for explaining the present embodiment shown in FIG. 14.

The transporting system includes a transport motor 156 for rotating a feeding roller 10, and driving rollers 16 and 24. The transport motor 156 is driven by the controller 140 through a motor driver 157. The feeding roller 10 is coupled to the transport motor 156 through a not-shown clutch, e.g. an electromagnetic clutch, which is adapted to disconnect the feeding roller 10 from the transport motor 156 each time the recording sheet 12 squeezes into between a nip roller 15 and the driving roller 16 of a first roller pair 14 disposed at the exit of a supply tray 11. The motors 138, 145 and 156 may be step motors or DC motors. In the case of the transport motor 156 being a DC motor, an edge sensor 151 for detecting one or both of front and rear edges of the recording sheet 12 is provided between the thermal head 18 and a second roller pair 22 constituted of the driving roller 24 and a nip roller 23.

Figure 16:
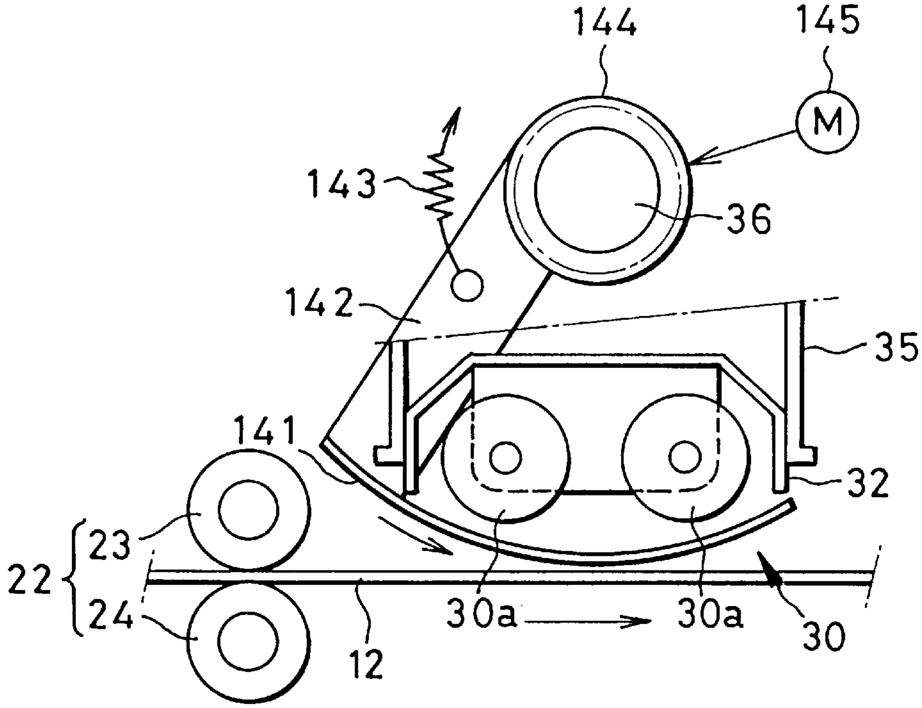
FIG. 16 is a side elevation illustrating a state where the shutter plate is inserted in front of the optical device in the thermal printer of FIG. 14.

When the shutter drive motor 145 is activated, the rotary gear 144 is rotated counterclockwise to move from a rest position shown in FIGS. 14 and 15 to a closed position shown in FIG. 16. When the shutter drive motor 145 is inactivated and the clutch disconnects the shutter drive motor 145 from the rotary gear 144, the shutter plate 141 is moved back to the rest position under the force of the spring 143. Instead of the motor 145, it is possible to use a solenoid to activate the shutter plate 141.

Thanks to the shutter plate 141 being curved and mounted rotatable about the shaft 36 though the connection arm 142, it is possible to dispose the fixing device 30 or 31 in proximity to the nip roller 23 without the danger of interference between the nip roller 23 and the shutter plate 141.

Figure 17A:
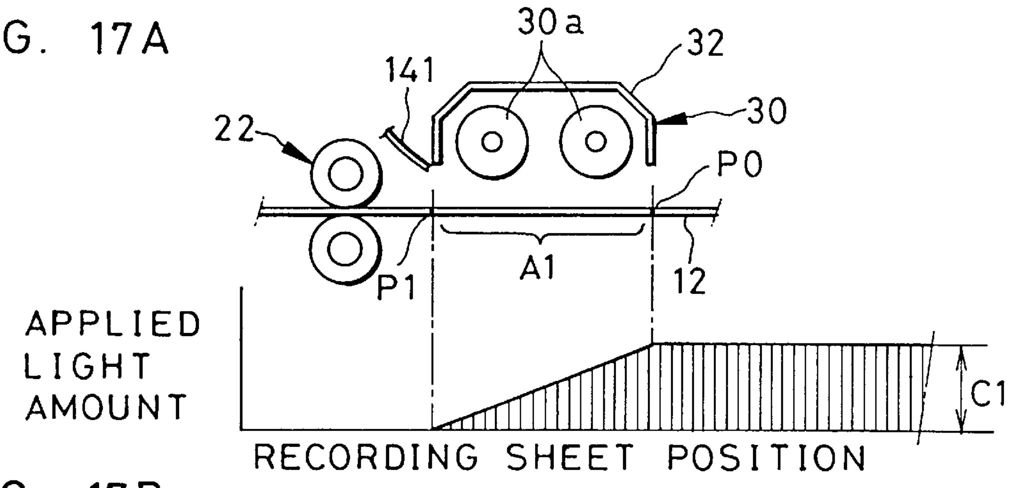
FIGS. 17A, 17B and 17C are diagrams illustrating a curve of light amounts projected onto respective portions of the color thermosensitive recording sheet in an embodiment where the sheet is stopped after deceleration.
Figure 17B:
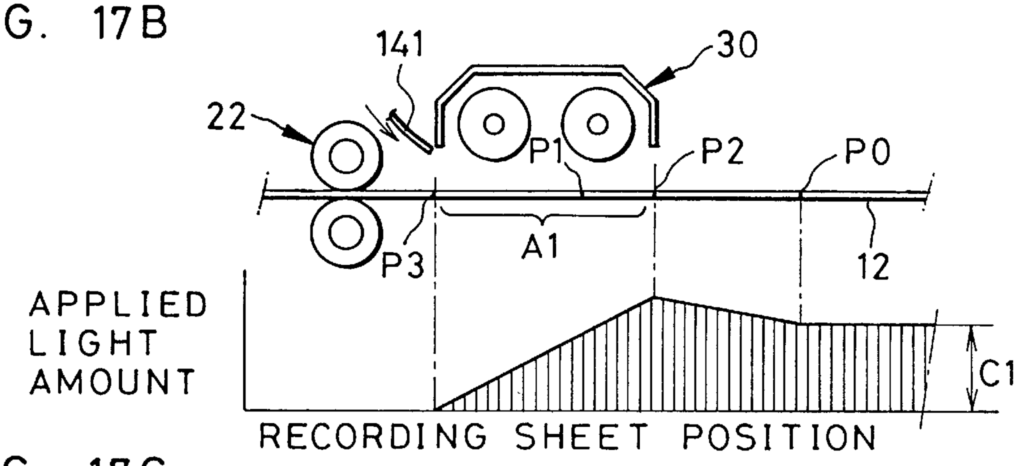
Figure 17C:
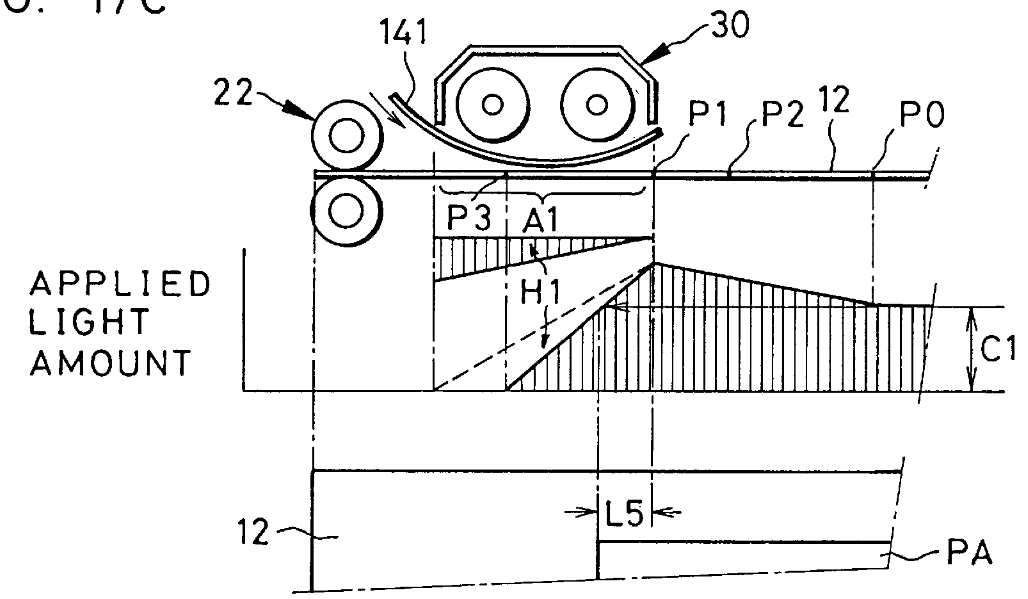

FIGS. 17A, 17B and 17C illustrate a relationship between the amount of fixing light having been applied to respective points of the recording sheet 12 and the position of the recording sheet 12 moving from the thermal head 18 through a fixing station A1 under the fixing device 30. The longer a respective point of the recording sheet 12 is exposed to the fixing light, the larger amount of fixing light is applied and accumulated in this point. Since the accumulated light amount substantially corresponds to the degree of fixation, the degree of fixation at the respective point becomes the larger, as the respective point passes through the fixing station A1 as is shown in FIG. 17A.

FIG. 17A shows a fixing stage where the recording sheet 12 has been transported constantly at a predetermined speed, e.g. 20 mm/sec through the fixing station A1, while the fixing device 30 is fully opened and turned on. In this stage, a portion of the recording sheet 12 that has passed through the fixing station A1 has been applied with a constant amount C1 of fixing light which is enough to fix the yellow recording layer of the recording sheet 12 to a proper degree. The amount of applied fixing light, or the degree of fixation, decreases from the constant level C1 to zero in a portion of the recording sheet 12 located in the fixing station A1, that is, from a point P0 at a front end of the fixing station A1 to a point P1 at a rear end of the fixing station A1 with respect to the moving direction of the recording sheet 12.

According to an embodiment, the transport speed of the recording sheet 12 is reduced to two-third, i.e. 13.3 mm/sec in this instance, when the edge sensor 151 detects a rear edge 12*a* of the recording sheet 12. Supposing that the speed-reduction is effected from the position shown in FIG. 17A and that the fixing station A1 has a length of 40 mm, the amount of light applied to the respective point of the recording sheet becomes as shown in FIG. 17B in a stage two seconds after the speed-reduction.

As shown in FIG. 17B, because of the deceleration, the amount of applied light redundantly increases from the constant level C1 in a range from the point P0, which was positioned at the front end of the fixing station A1 at the start of decelerated transportation, to a point P2 presently positioned at the front end of the fixing station A1. According to the embodiment shown in FIGS. 17A to 17C, the shutter plate 141 begins to close the fixing device 30 from this stage, that is, two seconds after the deceleration.

The speed of closing the shutter plate 141 is set at 40 mm/sec, i.e. three times as large as the decelerated transport speed of 13.3 mm/sec. As a result, the shutter plate 141 completely closes the fixing device 30 in a second from the start of closing, as is shown in FIG. 17C. When the shutter plate 114 completely shields the fixing device 30 from the recording sheet 12, the recording sheet 12 stops being transported and the fixing device 30 is turned off.

Accordingly, the point P1, which is positioned in the rear end of the fixing station A1 at the start of the deceleration, and is positioned in the front end of the fixing station A1 at the end of the fixation accepts a maximum amount of fixing light available at the decelerated transport speed through the fixing device 30. Since the decelerated speed is 13.3 mm/sec. in this instance, the maximum light amount accumulated in the point P1 is one and half of the constant amount C1 available at the transport speed of 20 mm/sec.

Areas designated by H1 each corresponds to the amount of light cut by the shutter plate 141 inserted at the speed of 40 mm/sec from the rear end to the front end of the fixing station A1, that is, in the same direction as the recording sheet transport direction during the fixation. As shown in FIG. 17C, the increase of the light amount due to the decelerated transportation reduces the area in which the degree of fixation is less than the constant amount C1 and hence insufficient. Accordingly, thanks to the deceleration, the available area PA for printing in the recording sheet 12 is extended by a length L5, compared with the case where the recording sheet 12 is not decelerated until the end of transportation. In that case, insufficient fixation occurs over an area stopped in the fixing station A1, like as shown in FIG. 17A.

After the shutter plate 141 completes closing, the ultraviolet lamps 30*a* of the yellow fixing device 30 are turned off. Also, the shutter drive motor 45 is turned off, so that the shutter plate 141 is moved back to the rest position under the force of the spring 143. Thereafter, the inverter motor 138 is rotated to turn over the fixer support device 35 through an angle of 180 degrees, to set the magenta fixing device 31 in the fixing station A1. Then, the controller 140 causes the thermal head 18 to rotate counterclockwise about a shaft 20 to retract it upward from a sheet transport path. Thereafter, the transport motor 156 is rotated reversely to transport the recording sheet 12 in a reverse direction from the fixing station A1 to a printing start position for the thermal printer 18.

Magenta recording and fixing are performed in the same way as for yellow. When the shutter plate 141 completely closes the magenta fixing device 31 in synchronism with the decelerated transportation of the recording sheet 12, the fixer support device 35 is rotated by 180 degree to set the yellow fixing device 30 in the fixing station A1. Thereafter, the thermal head 18 is retracted from the transport path, and the transport motor 156 is rotated reversely to set the recording sheet 12 back in the printing start position. Then, cyan recording is executed line-by-line. Cyan fixing is not executed because the cyan recording layer 26 cannot and need not be optically fixed. This is because cyan coloring needs so large heat energy that could not be applied under usual maintenance conditions.

It is alternatively possible to continuously activate the magenta fixing lamps 31*a* for bleaching, without inserting the shutter plate 141 after the magenta fixing.

Although the transport speed is slowed down to a lower value for a time duration before stopping the recording sheet 12 in the above embodiment, it is possible to continuously slow down the speed to zero. In this case, the speed of the shutter plate is changed in accordance with the transport speed, such that the amount of fixing light applied in this way becomes as equal as possible over the end portion stopped in the fixing station A1. The lower the transport speed, the larger the amount of applied fixing light becomes. Therefore, available printing area PA can be made the larger. It may be possible to omit the shutter plate 141, and stop the recording sheet 12 after decelerating it for a time duration suitable for enlarging the available printing area PA.

Also, this embodiment may be applicable to the thermal printer having a single lamp for fixing each color of yellow and magenta. The single lamps may be arranged side-by-side in a stationary housing as shown in FIG. 20, or may be supported by a rotatable frame like the fixer support device 35. The fixer support device 35 may be mounted rotatable on a frame device like the frame device 40 in a manner as shown in FIGS. 1 and 3. The swingable shutter plate 141 and its drive mechanism may be applicable to a thermal printer wherein the supply tray and the sheet supply path are arranged in a manner as shown in FIG. 13.

Figure 18:
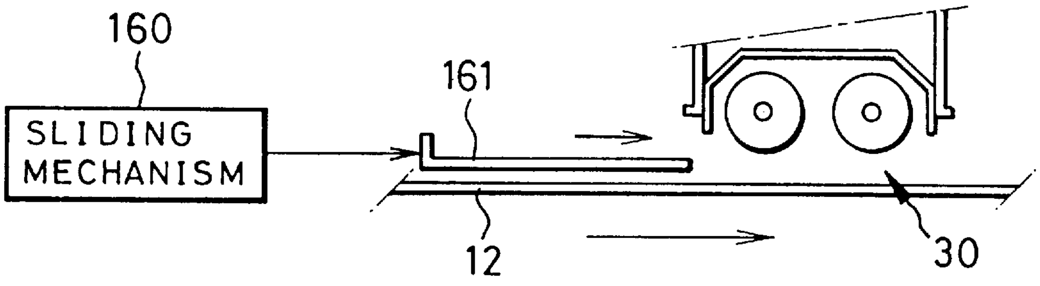
FIG. 18 is an explanatory view in elevation, illustrating another preferred shutter mechanism having a sliding shutter plate.

It is possible to use a slidable shutter plate 160 (see FIG. 18) in combination with the decelerated transportation of the recording sheet 12 in the end of fixation. A sliding mechanism 161 from the shutter plate 160 may be a rack-pinion mechanism or a link-mechanism.

Figure 19:
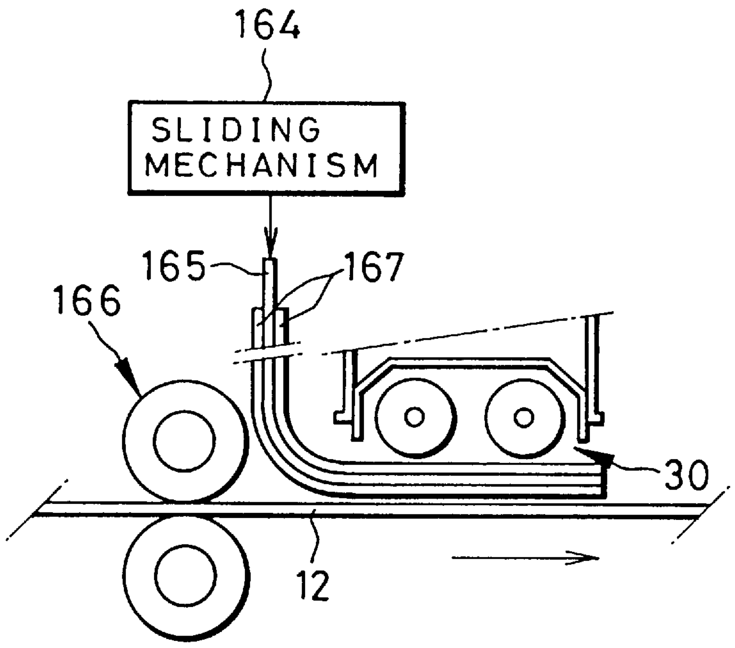
FIG. 19 is an explanatory view in elevation, illustrating another preferred shutter mechanism having an elastic sliding shutter plate.

To avoid interference between a slidable shutter plate and a nip roller, it is preferable to make the shutter plate as an elastic plate 165 such as a plastic plate, and guide the elastic shutter plate 165 through a curved guide member 167 as shown in FIG. 19, such that the shutter plate 165 is curved to retract upward from the nip roller 166.

It is of course possible to use the shutter plate 141 or 165 in the first described method, that is, for closing the fixing device 30 after the stop of recording sheet 12 by inserting the shutter plate 141 or 165 at the same speed as the preceding transport speed of the recording sheet 12 in the opposite direction to the preceding sheet transportation.

It is possible to decelerate the recording sheet 12 in a later stage of fixation for a smooth and accurate stop control thereof, while inserting the shutter plate in the opposite direction to the sheet transport direction. The speed of the shutter plate is determined such that, relative to the shutter plate, the decelerated transport speed of the recording sheet 12 is equal to its transport speed before deceleration. In addition, the amount of insertion of the shutter plate is determined such that the degree of fixation in an end portion fixed in this way becomes finally almost equal to the predetermined constant degree of fixation in the preceding portion of the recording sheet 12.

FIGS. 21A, 21B, 22 and 23 depict the method steps for printing a full—color image according to an embodiment of the present invention.

Thus, although the present invention has been described in detail by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A color thermal printer for printing a full-color image on a recording sheet of color thermosensitive recording material having at least first to third thermosensitive coloring layers, said color thermal printer comprising:

a thermal head for heating said recording sheet of thermosensitive recording material to develop respective colors in said at least first to third thermosensitive coloring layers in a frame sequential fashion;

a first fixing device disposed in a fixing station, said fixing station disposed downstream from said thermal head, for applying first electromagnetic rays to said recording sheet in said fixing station to optically fix said first coloring layer;

a second fixing device alternately disposed in said fixing station with respect to said first fixing device and proximate to said first fixing device, for applying second electromagnetic rays to said recording sheet in said fixing station to optically fix said second coloring layer;

a control device for activating said first fixing device while said thermal head records to said first coloring layer, and activating said second fixing device while said thermal head records to said second coloring layer;

a pair of transport rollers disposed between said thermal head and said fixing station to nip and transport said recording sheet in a first direction from said thermal head to said fixing station while said thermal head records to each of said coloring layers, and in a second direction reverse to said first direction to reset said recording sheet in a position for starting recording to the next one of said coloring layers;

a shutter plate proximate to said fixing station and mounted insertable into said fixing station in said second direction to shield said first and second electromagnetic rays from said recording sheet;

a shutter drive mechanism for moving said shutter plate into said fixing station;

a driver; and an interlocking device which transmits power of said driver to said transport rollers to transport said recording sheet at a constant transport speed in said first direction until a rear end of said recording sheet in said first direction reaches said transport rollers, and then disconnects said driver from said transport rollers to connect said driver to said shutter drive mechanism, thereby to insert said shutter plate into said fixing station at the same speed as said constant transport speed while said recording sheet stops with said rear end nipped between said transport rollers.

2. A color thermal printer as claimed in claim 1, wherein said transport rollers are disposed in proximity to said fixing station.

3. A color thermal printer as claimed in claim 2, further comprising means for placing said first and second fixing device alternatively in said fixing station.

4. A color thermal printer as claimed in claim 1, wherein said shutter plate is mounted slidable along a transport path of said recording sheet.

5. A color thermal printer as claimed in claim 4, wherein said shutter plate is made of an elastic material and is guided along a curved guide member to retract away from said transport path.

6. A color thermal printer as claimed in claim 1, wherein said shutter plate is mounted swingable about an axis orthogonally traversing a transport path of said recording sheet.

7. A color thermal printer as claimed in claim 1, wherein said first to third coloring layers are capable of developing a yellow color, a magenta color and a cyan color, respectively, and said first electromagnetic rays have a wavelength range of about 420 nm, whereas said second electromagnetic rays have a wavelength range of about 365 nm.

8. A color thermal printer as claimed in claim 7, wherein said driver actuates said shutter drive mechanism only while said first fixing device is activated.

9. A color thermal printer as claimed in claim 8, wherein said interlocking device is adapted to disconnect said driver from said shutter device and connect said driver to said transport rollers after said shutter plate is fully inserted in said fixing station, said driver thereafter rotating said transport rollers reversely to transport said recording sheet in said second direction.

10. A color thermal printer for printing a full-color image on a recording sheet of color thermosensitive recording material having at least first to third thermosensitive coloring layers, said color thermal printer comprising:

a thermal head for heating said recording sheet of thermosensitive recording material to develop respective colors in said at least first to third thermosensitive coloring layers in a frame sequential fashion;

a first fixing device disposed in a fixing station, said fixing station disposed downstream from said thermal head, for applying first electromagnetic rays to said recording sheet in said fixing station to optically fix said first coloring layer;

a second fixing device alternately disposed in said fixing station with respect to said first fixing device and proximate to said first fixing device, for applying second electromagnetic rays to said recording sheet in said fixing station to optically fix said second coloring layer;

a control device for activating said first fixing device while said thermal head records to said first coloring layer, and activating said second fixing device while said thermal head records to said second coloring layer;

a pair of transport rollers disposed between said thermal head and said fixing station to nip and transport said recording sheet in a first direction from said thermal head to said fixing station while said thermal head records to each of said coloring layers, and in a second direction reverse to said first direction to reset said recording sheet in a position for starting recording to the next one of said coloring layers;

a shutter plate proximate to said fixing station and mounted insertable into said fixing station in said second direction to shield said first and second electromagnetic rays from said recording sheet;

a shutter drive mechanism for moving said shutter plate into said fixing station;

a first driver for rotating said transport rollers to transport said recording sheet at a speed variable depending upon a position of said recording sheet relative to said transport rollers; and a second driver which starts driving said shutter driver mechanism when a rear end of said recording sheet moving in said first direction reaches a predetermined position relative to said transport rollers, to move said shutter plate into said fixing station at a speed variable depending upon the speed of said recording sheet, such that said recording sheet is exposed to said electromagnetic rays as equally as possible in a largest possible area thereof.

11. A color thermal printer as claimed in claim 10, wherein said transport rollers are disposed in proximity to said fixing station.

12. A color thermal printer as claimed in claim 11, further comprising means for placing said first and second fixing device alternatively in said fixing station.

13. A color thermal printer as claimed in claim 12, wherein said shutter plate is mounted slidable along a transport path of said recording sheet.

14. A color thermal printer as claimed in claim 13, wherein said shutter plate is made of an elastic material and is guided along a curved guide member to retract away from said transport path.

15. A color thermal printer as claimed in claim 12, wherein said shutter plate is mounted swingable about an axis orthogonally traversing a transport path of said recording sheet.

16. A color thermal printer as claimed in claim 12, wherein said first to third coloring layers are capable of developing a yellow color, a magenta color and a cyan color, respectively, and said first electromagnetic rays have a wavelength range of about 420 nm, whereas said second electromagnetic rays have a wavelength range of about 365 nm.

17. A color thermal printing method for printing a full-color image on a recording sheet of color thermosensitive recording material having at least first to third thermosensitive coloring layers which develop respective colors when heated, comprising the steps of:

(A) transporting said recording sheet through a pair of transport rollers disposed between a thermal head and a fixing station, in a first direction from said thermal head to said fixing station at a constant speed;

(B) stopping said recording sheet when a rear end of said recording sheet in said first direction reaches a Pair of transport rollers which are disposed between said thermal head and said fixing station:

(C) recording to said first coloring layer through said thermal head during step A;

(D) applying during step A first electromagnetic rays to said recording sheet in said fixing station, to optically fix said first coloring layer; and (E) inserting during step B a shutter plate into said fixing station to shield said first electromagnetic rays from said recording sheet, said shutter plate being inserted in a second direction reverse to said first direction at a speed equal to said constant speed.

18. A color thermal printing method as claimed in claim 17, further comprises the steps of:

(F) transporting after step E said recording sheet in said second direction until a front end of said recording sheet in said first direction reaches said transport rollers;

(G) transporting after step F said recording sheet in said first direction until said rear end reaches said transport rollers;

(H) recording to said second coloring layer through said thermal head during step G;

(I) applying during step G second electromagnetic rays to said recording sheet in said fixing station, to optically fix said second coloring layer;

(J) transporting said recording sheet in said second direction until said front end of said recording sheet reaches said transport rollers;

(K) transporting after step J said recording sheet in said first direction; and (L) recording to said third coloring layer through said thermal head during step K.

19. A color thermal printing method as claimed in claim 18, further comprises the step of:

placing one of first and second fixing devices in said fixing station for applying one of said first and second electromagnetic rays.

20. A color thermal printing method for printing a full-color image on a recording sheet of color thermosensitive recording material having at least first to third thermosensitive coloring layers which develop respective colors when heated, comprising the steps of:

(A) transporting said recording sheet through a pair of transport rollers disposed between a thermal head and a fixing station, in a first direction toward said fixing station at a constant speed;

(B) decelerating said recording sheet when a rear end of said recording sheet reaches a predetermined position relative to said transport rollers;

(C) stopping said recording sheet when said rear end reaches said transport rollers;

(D) recording to said first coloring layer through said thermal head during step A; and (E) applying during steps A and B first electromagnetic rays to said recording sheet in said fixing station to optically fix said first coloring layer.

21. A color thermal printing method as claimed in claim 20, further comprises the steps of:

(F) transporting after step C said recording sheet in a second direction reverse to said first direction until a front end of said recording sheet in said first direction reaches said transport rollers;

(G) transporting after step F said recording sheet in said first direction until said rear end reaches said transport rollers;

(H) recording to said second coloring layer through said thermal head during step G;

(I) applying during step G second electromagnetic rays to said recording sheet in said fixing station, to optically fix said second coloring layer;

(J) transporting after step G said recording sheet in said second direction until said front end of said recording sheet reaches said transport rollers;

(K) transporting after step J said recording sheet in said first direction; and (L) recording to said third coloring layer through said thermal head during step K.

22. A color thermal printing method as claimed in claim 20, further comprises the step of:

inserting a shutter plate into said fixing station during step C to shield said first electromagnetic rays from said recording sheet, said shutter plate being inserted in said first direction at a speed variable depending upon the deceleration of said recording sheet, so as to prevent over-exposure of said recording sheet to said first electromagnetic rays.

23. A color thermal printing method as claimed in claim 20, further comprises the steps of:

inserting a shutter plate into said fixing station during step C to shield said first electromagnetic rays from said recording sheet, said shutter plate being inserted in a second direction reverse to said first direction at a speed variable depending upon the deceleration of said recording sheet, so as to prevent over- and under-exposure of said recording sheet to said first electromagnetic rays.

24. A color thermal printing method as claimed in claim 23, wherein the speed of said shutter plate relative to said decelerated recording sheet is equal to said constant speed of said recording sheet.

25. A color thermal printing method for printing a full-color image on a recording sheet of color thermosensitive recording material having at least first to third thermosensitive coloring layers which develop respective colors when heated, comprising the steps of:

(A) transporting said recording sheet through a pair of transport rollers disposed between a thermal head and a fixing station, in a first direction at a constant speed;

(B) recording to said first coloring layer through said thermal head during step A;

(C) stopping after step A said recording sheet when said rear end of said recording sheet in said first direction reaches said transport rollers;

(D) retracting during step C a shutter plate from said fixing station in said first direction at a speed equal to said constant speed, said shutter plate shielding said recording sheet from a first fixing device disposed in said fixing station;

(E) transporting after step D said recording sheet in a second direction reverse to said first direction until a front end of said recording sheet in said first direction reaches said transport rollers;

(F) activating during steps D and E said first fixing device for projecting first electromagnetic rays to fix said first coloring layer;

(G) transporting said recording sheet in said first direction until said rear end reaches said transport rollers;

(H) recording to said second coloring layer through said thermal head during step G;

(I) transporting said recording sheet in said second direction until said front end of said recording sheet reaches said transport rollers;

(J) applying during step G second electromagnetic rays to said recording sheet in said fixing station, to optically fix said second coloring layer;

(K) transporting after step I said recording sheet in said first direction; and (L) recording to said third coloring layer through said thermal head during step K.

* * * * *